United States Patent
Wloczysiak et al.

(10) Patent No.: US 9,806,787 B2
(45) Date of Patent: Oct. 31, 2017

(54) DIVERSITY RECEIVER FRONT END SYSTEM WITH FLEXIBLE ANTENNA ROUTING

(71) Applicant: SKYWORKS SOLUTIONS, INC., Woburn, MA (US)

(72) Inventors: Stephane Richard Marie Wloczysiak, Irvine, CA (US); William J. Domino, Yorba Linda, CA (US); Bipul Agarwal, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 41 days.

(21) Appl. No.: 14/944,951

(22) Filed: Nov. 18, 2015

(65) Prior Publication Data

US 2016/0127015 A1    May 5, 2016

Related U.S. Application Data

(63) Continuation of application No. 14/836,575, filed on Aug. 26, 2015.

(Continued)

(51) Int. Cl.
  *H04J 3/14* (2006.01)
  *H04B 7/08* (2006.01)
  (Continued)

(52) U.S. Cl.
  CPC .................. *H04B 7/08* (2013.01); *H04B 1/40* (2013.01); *H04L 45/26* (2013.01); *H04W 40/04* (2013.01);
  (Continued)

(58) Field of Classification Search
  CPC ............ H04B 1/04; H04B 1/40; H03F 1/0277
  See application file for complete search history.

(56) References Cited

U.S. PATENT DOCUMENTS

| 5,134,417 A | 7/1992 | Thompson |
| 5,373,299 A | 12/1994 | Ozaki et al. |

(Continued)

FOREIGN PATENT DOCUMENTS

| CN | 201467459 | 5/2010 |
| JP | 2004-208221 | 7/2004 |

(Continued)

*Primary Examiner* — Shaq Taha
(74) *Attorney, Agent, or Firm* — Chang & Hale LLP

(57) ABSTRACT

Diversity receiver front end system with flexible antenna routing. A receiving system can include a plurality of amplifiers. Each one of the plurality of amplifiers can be disposed along a corresponding one of a plurality of paths between an input of the receiving system and an output of the receiving system. Each one of the plurality of paths can correspond to a different frequency band. The receiving system can include an input multiplexer configured to receive, at one or more of a plurality of input multiplexer inputs, one or more RF signals. Each one of the one or more RF signals can include one or more frequency bands. The input multiplexer can be configured to output each of the one or more RF signals to one or more of a plurality of input multiplexer outputs. The receiving system can include a controller configured to receive an antenna configuration signal and, based on the antenna configuration signal, control the input multiplexer to route each of the one or more RF signals to propagate along one or more of the plurality of paths corresponding to the one of more frequency bands of the RF signal.

20 Claims, 20 Drawing Sheets

Related U.S. Application Data

(60) Provisional application No. 62/073,043, filed on Oct. 31, 2014, provisional application No. 62/073,042, filed on Oct. 31, 2014.

(51) Int. Cl.

| | | |
|---|---|---|
| *H04B 1/40* | (2015.01) | |
| *H04L 12/721* | (2013.01) | |
| *H04W 40/04* | (2009.01) | |
| *H04W 40/06* | (2009.01) | |
| *H04W 40/10* | (2009.01) | |
| *H04W 40/24* | (2009.01) | |

(52) U.S. Cl.
CPC ........... *H04W 40/06* (2013.01); *H04W 40/10* (2013.01); *H04W 40/246* (2013.01); *H04B 7/082* (2013.01); *H04B 7/0837* (2013.01)

(56) References Cited

U.S. PATENT DOCUMENTS

| | | | |
|---|---|---|---|
| 6,552,626 B2 | 4/2003 | Sharpe et al. | |
| 6,577,353 B1 | 6/2003 | Welles, II et al. | |
| 7,545,847 B2 | 6/2009 | Chang et al. | |
| 7,796,714 B2 | 9/2010 | Rabbath et al. | |
| 8,200,181 B1 | 6/2012 | Khlat et al. | |
| 8,754,794 B1* | 6/2014 | Li | H03M 1/1057 341/118 |
| 2003/0185250 A1 | 10/2003 | Harberts et al. | |
| 2006/0205352 A1 | 9/2006 | Bialek et al. | |
| 2009/0322632 A1 | 12/2009 | Milosevic | |
| 2011/0021245 A1 | 1/2011 | Taniuchi | |
| 2011/0156812 A1* | 6/2011 | Parkhurst | H03F 1/0277 330/124 R |
| 2013/0043946 A1* | 2/2013 | Hadjichristos | H04B 1/0057 330/252 |
| 2014/0079167 A1 | 3/2014 | Adam et al. | |
| 2015/0249479 A1* | 9/2015 | Nobbe | H04B 17/12 455/77 |
| 2015/0373711 A1* | 12/2015 | Narathong | H04W 72/0453 370/280 |

FOREIGN PATENT DOCUMENTS

| | | |
|---|---|---|
| JP | 2005-210460 | 8/2005 |
| JP | 2012-109972 | 6/2012 |
| KR | 10-2004-0100056 | 12/2004 |
| WO | WO 2013/025953 | 2/2013 |
| WO | WO 2013/085721 | 6/2013 |

\* cited by examiner

DIVERSITY RECEIVER FRONT END SYSTEM WITH FLEXIBLE ANTENNA ROUTING

CROSS-REFERENCE TO RELATED APPLICATION(S)

This application is a continuation of U.S. patent application Ser. No. 14/836,575 filed Aug. 26, 2015, entitled DIVERSITY RECEIVER FRONT END SYSTEM WITH FLEXIBLE BAND ROUTING, which claims priority to U.S. Provisional Application No. 62/073,043 filed Oct. 31, 2014, entitled DIVERSITY RECEIVER FRONT END SYSTEM, and U.S. Provisional Application No. 62/073,042 filed Oct. 31, 2014, entitled FLEXIBLE MULTI-BAND MULTI-ANTENNA RECEIVER MODULE, the disclosures of which are hereby expressly incorporated by reference herein in their entirety.

BACKGROUND

Field

The present disclosure generally relates to wireless communication systems having one or more diversity receiving antennas.

Description of the Related Art

In wireless communication applications, size, cost, and performance are examples of factors that can be important for a given product. For example, to increase performance, wireless components such as a diversity receive antenna and associated circuitry are becoming more popular.

In many radio-frequency (RF) applications, a diversity receive antenna is placed physically far from a primary antenna. When both antennas are used at once, a transceiver can process signals from both antennas in order to increase data throughput.

SUMMARY

In accordance with some implementations, the present disclosure relates to a receiving system including a plurality of amplifiers. Each one of the plurality of amplifiers is disposed along a corresponding one of a plurality of paths between an input of the receiving system and an output of the receiving system. Each one of the plurality of paths corresponds to a different frequency band. The receiving system includes an input multiplexer configured to receive, at one or more of a plurality of input multiplexer inputs, one or more RF signals. Each one of the one or more RF signals includes one or more frequency bands. The input multiplexer is configured to output each of the one or more RF signals to one or more of a plurality of input multiplexer outputs. The receiving system includes a controller configured to receive an antenna configuration signal and, based on the antenna configuration signal, control the input multiplexer to route each of the one or more RF signals to propagate along one or more of the plurality of paths corresponding to the one of more frequency bands of the RF signal.

In some embodiments, in response to an antenna configuration signal indicating that the receiving system includes a single antenna, the controller can be configured to control the input multiplexer to route an RF signal received at a single input multiplexer input to all of the plurality of input multiplexer outputs associated with the one or more frequency bands of the RF signal.

In some embodiments, in response to an antenna configuration signal indicating that the receiving system includes a single antenna, the controller can be configured to control the input multiplexer to route an RF signal received at a single input multiplexer input to all of the plurality of input multiplexer outputs.

In some embodiments, the controller can be configured to, in response to a first antenna configuration signal, control the input multiplexer to route an RF signal received at a first input multiplexer input to an input multiplexer output and, in response to a second antenna configuration signal, control the input multiplexer to route an RF signal received at a second input multiplexer input to the input multiplexer output.

In some embodiments, a first input multiplexer input can be coupled to the plurality of input multiplexer outputs via a first plurality of switches and a second input multiplexer input can be coupled to the plurality of input multiplexer outputs via a second plurality of switches. In some embodiments, the controller can control the input multiplexer by controlling the first plurality of switches and the second plurality of switches. In some embodiments, the first plurality of switches can include a first plurality of single-pole/single-throw (SPST) switches and the second plurality of switches can include a second plurality of SPST switches.

In some embodiments, a first input multiplexer input can be coupled to a first input multiplexer output, a second multiplexer output via a first switch, and a third input multiplexer output via a second switch and a second input multiplexer input can be coupled to the second multiplexer output via the first switch, the third input multiplexer output via the second switch, and a fourth input multiplexer output. In some embodiments, the controller can control the input multiplexer by controlling the first switch and the second switch. In some embodiments, the first switch can include a first multiple-pole/single-throw (MPST) switch and the second switch can include a second MPST.

In some embodiments, the controller can be further configured to receive a band select signal and to control the input multiplexer based on the band select signal.

In some embodiments, the input multiplexer can be implemented as a band splitter. In some embodiments, the band splitter can include one or more bandpass filters. In some embodiments, the band splitter can include one or more diplexers.

In some embodiments, the receiving system can further include a plurality of antennas respectively coupled to the plurality of input multiplexer inputs.

In some implementations, the present disclosure relates to a radio-frequency (RF) module that includes a packaging substrate configured to receive a plurality of components. The RF module further includes a receiving system implemented on the packaging substrate. The receiving system includes a plurality of amplifiers. Each one of the plurality of amplifiers is disposed along a corresponding one of a plurality of paths between an input of the receiving system and an output of the receiving system. Each one of the plurality of paths corresponds to a different frequency band. The receiving system includes an input multiplexer configured to receive, at one or more of a plurality of input multiplexer inputs, one or more RF signals, each one of the one or more RF signals including one or more frequency bands. The input multiplexer is configured to output each of the one or more RF signals to one or more of a plurality of input multiplexer outputs. The receiving system includes a controller configured to receive an antenna configuration signal and, based on the antenna configuration signal, control the input multiplexer to route each of the one or more RF signals to propagate along one or more of the plurality of paths corresponding to the one of more frequency bands of the RF signal.

In some embodiments, the RF module can be a diversity receiver front-end module (FEM).

In some embodiments, the input multiplexer can be implemented as a band splitter including at least one of a bandpass filter or a diplexer.

According to some teachings, the present disclosure relates to a wireless device that includes a first antenna configured to receive a first radio-frequency (RF) signal. The wireless device further includes a first front-end module (FEM) in communication with the first antenna. The first FEM including a packaging substrate configured to receive a plurality of components. The first FEM further includes a receiving system implemented on the packaging substrate. The receiving system includes a plurality of amplifiers. Each one of the plurality of amplifiers is disposed along a corresponding one of a plurality of paths between an input of the receiving system and an output of the receiving system. Each one of the plurality of paths corresponds to a different frequency band. The receiving system includes an input multiplexer configured to receive, at one or more of a plurality of input multiplexer inputs, one or more RF signals. Each one of the one or more RF signals includes one or more frequency bands. The input multiplexer is configured to output each of the one or more RF signals to one or more of a plurality of input multiplexer outputs. The receiving system includes a controller configured to receive an antenna configuration signal and, based on the antenna configuration signal, control the input multiplexer to route each of the one or more RF signals to propagate along one or more of the plurality of paths corresponding to the one of more frequency bands of the RF signal. The wireless device further includes a communications module configured to receive a processed version of the first RF signal from the output via a plurality of transmission lines respectively coupled to the plurality of output multiplexer outputs and to generate data bits based on the processed version of the first RF signal.

In some embodiments, the wireless device further includes a second antenna configured to receive a second radio-frequency (RF) signal and a second FEM in communication with the second antenna. The communications module can be configured to receive a processed version of the second RF signal from an output of the second FEM and generate the data bits based on the processed version of the second RF signal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
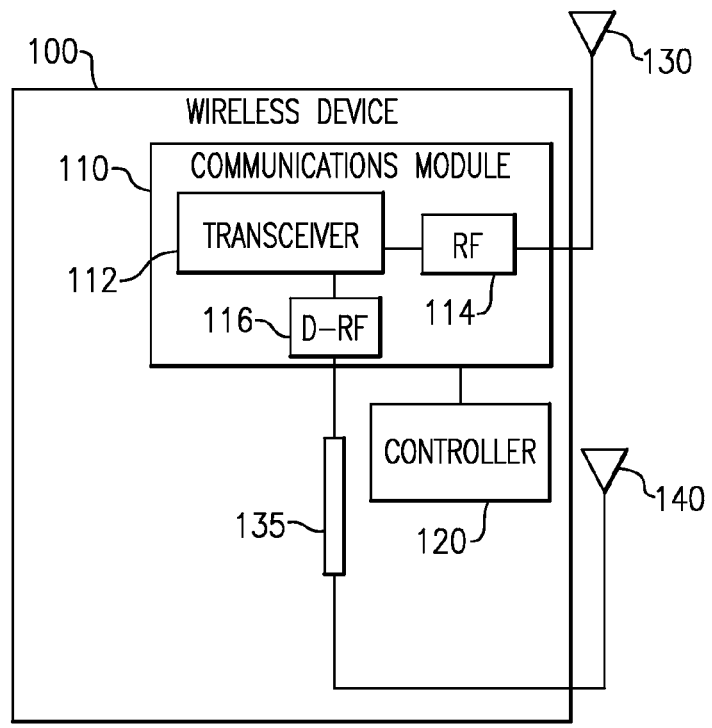
FIG. 1 shows a wireless device having a communications module coupled to a primary antenna and a diversity antenna.

FIG. 1 shows a wireless device 100 having a communications module 110 coupled to a primary antenna 130 and a diversity antenna 140. The communications module 110 (and its constituent components) may be controlled by a controller 120. The communications module 110 includes a transceiver 112 that is configured to convert between analog radio-frequency (RF) signals and digital data signals. To that end, the transceiver 112 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components.

The communications module 110 further includes an RF module 114 coupled between the primary antenna 130 and the transceiver 112. Because the RF module 114 may be physically close to the primary antenna 130 to reduce attenuation due to cable loss, the RF module 114 may be referred to as front-end module (FEM). The RF module 114 may perform processing on an analog signal received from the primary antenna 130 for the transceiver 112 or received from transceiver 112 for transmission via the primary antenna 130. To that end, the RF module 114 may include filters, power amplifiers, band select switches, matching circuits, and other components. Similarly, the communications module 110 includes a diversity RF module 116 coupled between the diversity antenna 140 and the transceiver 112 that performs similar processing.

When a signal is transmitted to the wireless device, the signal may be received at both the primary antenna 130 and the diversity antenna 140. The primary antenna 130 and diversity antenna 140 may be physically spaced apart such that the signal at the primary antenna 130 and diversity antenna 140 is received with different characteristics. For example, in one embodiment, the primary antenna 130 and diversity antenna 140 may receive the signal with different attenuation, noise, frequency response, or phase shift. The transceiver 112 may use both of the signals with different characteristics to determine data bits corresponding to the signal. In some implementations, the transceiver 112 selects from between the primary antenna 130 and the diversity antenna 140 based on the characteristics, such as selecting the antenna with the highest signal-to-noise ratio. In some implementations, the transceiver 112 combines the signals from the primary antenna 130 and the diversity antenna 140 to increase the signal-to-noise ratio of the combined signal. In some implementations, the transceiver 112 processes the signals to perform multiple-input/multiple-output (MIMO) communication.

Because the diversity antenna 140 is physically spaced apart from the primary antenna 130, the diversity antenna 140 is coupled to the communications module 110 by transmission line 135, such as a cable or a printed circuit board (PCB) trace. In some implementations, the transmission line 135 is lossy and attenuates the signal received at the diversity antenna 140 before it reaches the communications module 110. Thus, in some implementations, as described below, gain is applied to the signal received at the diversity antenna 140. The gain (and other analog processing, such as filtering) may be applied by a diversity receiver module. Because such a diversity receiver module may be located physically close to the diversity antenna 140, it may be referred to a diversity receiver front-end module.

Figure 2:
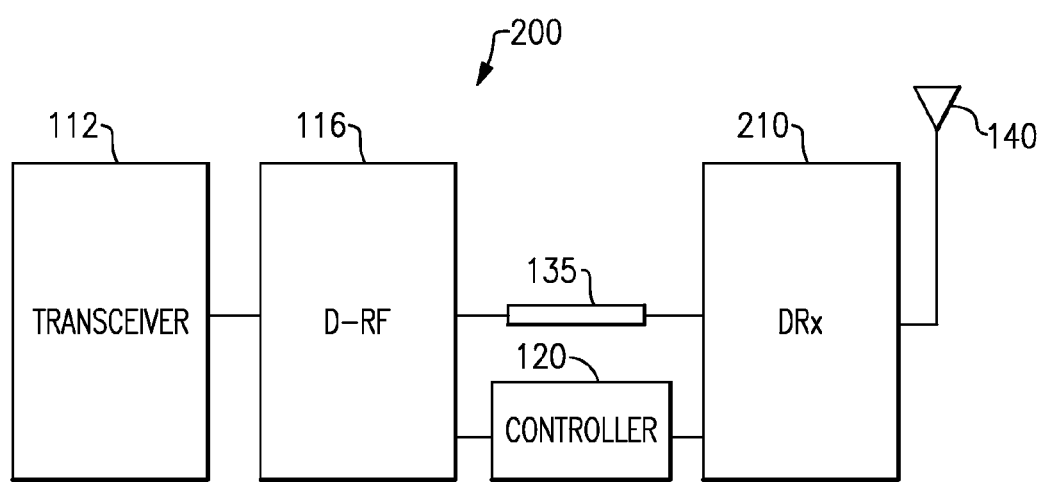
FIG. 2 shows a diversity receiver (DRx) configuration including a DRx front-end module (FEM).

FIG. 2 shows a diversity receiver (DRx) configuration 200 including a DRx front-end module (FEM) 210. The DRx configuration 200 includes a diversity antenna 140 that is configured to receive a diversity signal and provide the diversity signal to the DRx FEM 210. The DRx FEM 210 is configured to perform processing on the diversity signal received from the diversity antenna 140. For example, the DRx FEM 210 may be configured to filter the diversity signal to one or more active frequency bands, e.g., as indicated by the controller 120. As another example, the DRx FEM 210 may be configured to amplify the diversity signal. To that end, the DRx FEM 210 may include filters, low-noise amplifiers, band select switches, matching circuits, and other components.

The DRx FEM 210 transmits the processed diversity signal via a transmission line 135 to a downstream module, such as the diversity RF (D-RF) module 116, which feeds a further processed diversity signal to the transceiver 112. The diversity RF module 116 (and, in some implementations, the transceiver), is controlled by the controller 120. In some implementations, the controller 120 may be implemented within the transceiver 112.

Figure 3:
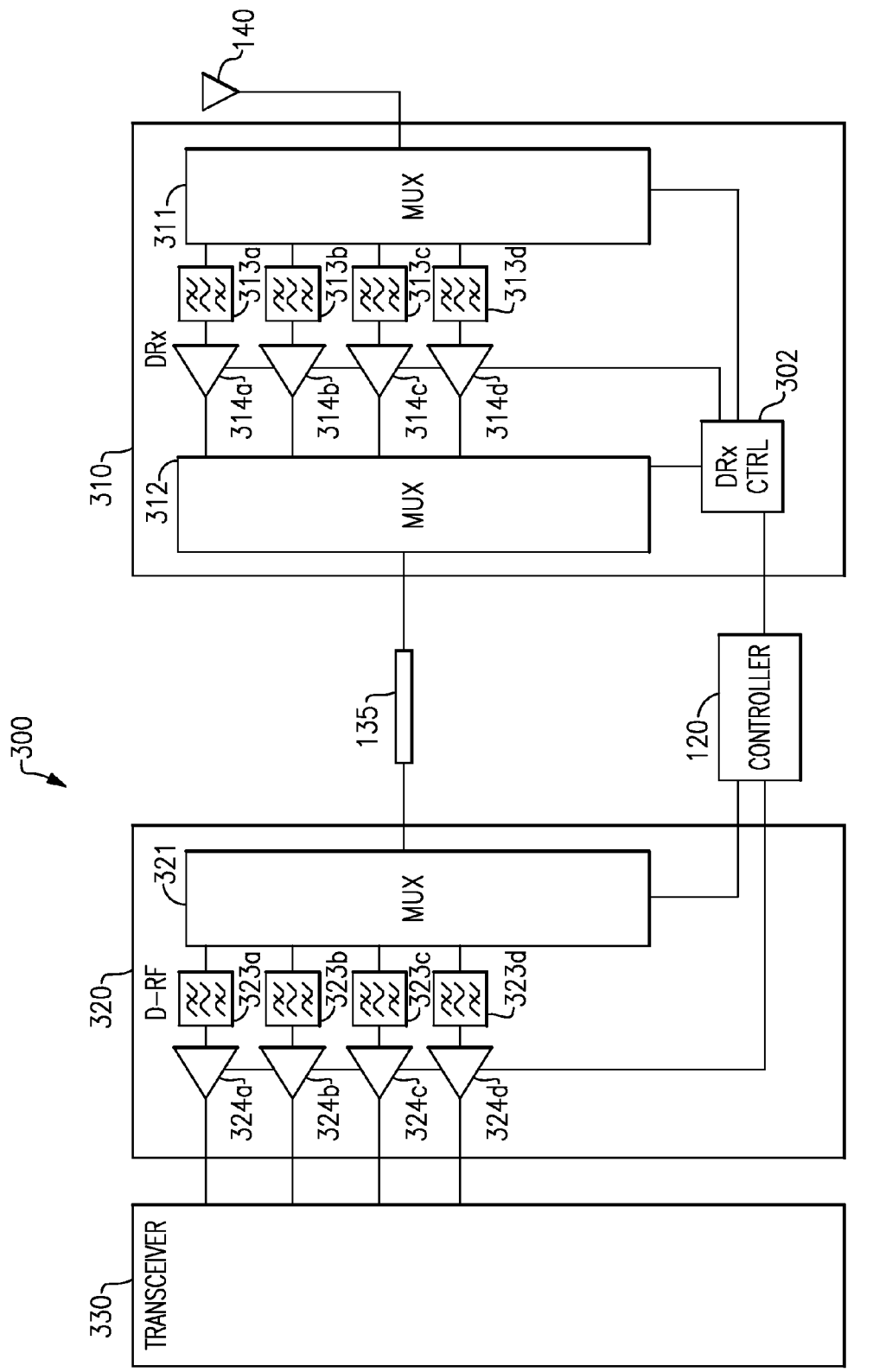
FIG. 3 shows that in some embodiments, a diversity receiver (DRx) configuration may include a DRx module with multiple paths corresponding to multiple frequency bands.

FIG. 3 shows that in some embodiments, a diversity receiver (DRx) configuration 300 may include a DRx module 310 with multiple paths corresponding to multiple frequency bands. The DRx configuration 300 includes a diversity antenna 140 configured to receive a diversity signal. In some implementations, the diversity signal may be a single-band signal including data modulated onto a single frequency band. In some implementations, the diversity signal may be a multi-band signal (also referred to as an inter-band carrier aggregation signal) including data modulated onto multiple frequency bands.

The DRx module 310 has an input that receives the diversity signal from the diversity antenna 140 and an output that provides a processed diversity signal to the transceiver 330 (via the transmission line 135 and the diversity RF module 320). The DRx module 310 input feeds into an input of first multiplexer 311. The first multiplexer (MUX) 311 includes a plurality of multiplexer outputs, each corresponding to a path between the input and the output of the DRx module 310. Each of the paths may correspond to a respective frequency band. The DRx module 310 output is provided by the output of second multiplexer 312. The second multiplexer 312 includes a plurality of multiplexer inputs, each corresponding to one of the paths between the input and the output of the DRx module 310.

The frequency bands may be cellular frequency bands, such as UMTS (Universal Mobile Telecommunications System) frequency bands. For example, a first frequency band may be UMTS downlink or "Rx" Band 2, between 1930 megahertz (MHZ) and 1990 MHz, and a second frequency band may be UMTS downlink or "Rx" Band 5, between 869 MHz and 894 MHz. Other downlink frequency bands may be used, such as those described below in Table 1 or other non-UMTS frequency bands.

In some implementations, the DRx module 310 includes a DRx controller 302 that receives signals from the controller 120 (also referred to as a communications controller) and, based on the received signals, selectively activates one or more of the plurality of paths between the input and the output. In some implementations, the DRx module 310 does not include a DRx controller 302 and the controller 120 selectively activates the one or more of the plurality of paths directly.

As noted above, in some implementations, the diversity signal is a single-band signal. Thus, in some implementations, the first multiplexer 311 is a single-pole/multiple-throw (SPMT) switch that routes the diversity signal to one of the plurality of paths corresponding to the frequency band of the single-band signal based on a signal received from the DRx controller 302. The DRx controller 302 may generate the signal based on a band select signal received by the DRx controller 302 from the communications controller 120. Similarly, in some implementations, the second multiplexer 312 is a SPMT switch that routes the signal from the one of the plurality of paths corresponding to the frequency band of the single-band signal based on a signal received from the DRx controller 302.

As noted above, in some implementations, the diversity signal is a multi-band signal. Thus, in some implementations, the first multiplexer 311 is a signal splitter that routes the diversity signal to two or more of the plurality of paths corresponding to the two or more frequency bands of the multi-band signal based on a splitter control signal received from the DRx controller 302. The function of the signal splitter may be implemented as a SPMT switch, a diplexer filter, or some combination of these. Similarly, in some implementations, the second multiplexer 312 is a signal combiner that combines the signals from the two or more of the plurality of paths corresponding to the two or more frequency bands of the multi-band signal based on a combiner control signal received from the DRx controller 302. The function of the signal combiner may be implemented as a SPMT switch, a diplexer filter, or some combination of these. The DRx controller 302 may generate the splitter control signal and the combiner control signal based on a band select signal received by the DRx controller 302 from the communications controller 120.

Thus, in some implementations, the DRx controller 302 is configured to selectively activate one or more of the plurality of paths based on a band select signal received by the DRx controller 302 (e.g., from the communications controller 120). In some implementations, the DRx controller 302 is configured to selectively activate one or more of the plurality of paths by transmitting a splitter control signal to a signal splitter and a combiner control signal to a signal combiner.

The DRx module 310 includes a plurality of bandpass filters 313a-313d. Each one of the bandpass filters 313a-313d is disposed along a corresponding one of the plurality of paths and configured to filter a signal received at the bandpass filter to the respective frequency band of the one of the plurality of paths. In some implementations, the bandpass filters 313a-313d are further configured to filter a signal received at the bandpass filter to a downlink frequency sub-band of the respective frequency band of the one of the plurality of paths. The DRx module 310 includes a plurality of amplifiers 314a-314d. Each one of the amplifiers 314a-314d is disposed along a corresponding one of the plurality of paths and configured to amplify a signal received at the amplifier.

In some implementations, the amplifiers 314a-314d are narrowband amplifiers configured to amplify a signal within the respective frequency band of the path in which the amplifier is disposed. In some implementations, the amplifiers 314a-314d are controllable by the DRx controller 302. For example, in some implementations, each of the amplifiers 314a-314d includes an enable/disable input and is enabled (or disabled) based on an amplifier enable signal received and the enable/disable input. The amplifier enable signal may be transmitted by the DRx controller 302. Thus, in some implementations, the DRx controller 302 is configured to selectively activate one or more of the plurality of paths by transmitting an amplifier enable signal to one or more of the amplifiers 314a-314d respectively disposed along the one or more of the plurality of paths. In such implementations, rather than being controlled by the DRx controller 302, the first multiplexer 311 may be a signal splitter that routes the diversity signal to each of the plurality of paths and the second multiplexer 312 may be a signal combiner that combines the signals from each of the plurality of paths. However, in implementations in which the DRx controller 302 controls the first multiplexer 311 and second multiplexer 312, the DRX controller 302 may also enable (or disable) particular amplifiers 314a-314d, e.g., to save battery.

In some implementations, the amplifiers 314a-314d are variable-gain amplifiers (VGAs). Thus, the some implementations, the DRx module 310 includes a plurality of variable-gain amplifiers (VGAs), each one of the VGAs disposed along a corresponding one of the plurality of paths and configured to amplify a signal received at the VGA with a gain controlled by an amplifier control signal received from the DRx controller 302.

The gain of a VGA may be bypassable, step-variable, continuously-variable. In some implementations, at least one of the VGAs includes a fixed-gain amplifier and a bypass switch controllable by the amplifier control signal. The bypass switch may (in a first position) close a line between an input of the fixed-gain amplifier to an output of fixed-gain amplifier, allowing a signal to bypass the fixed-gain amplifier. The bypass switch may (in a second position) open the line between the input and the output, passing a signal through the fixed-gain amplifier. In some implementations, when the bypass switch is in the first position, the fixed-gain amplifier is disabled or otherwise reconfigured to accommodate the bypass mode.

In some implementations, at least one of the VGAs includes a step-variable gain amplifier configured to amplify the signal received at the VGA with a gain of one of plurality of configured amounts indicated by the amplifier control signal. In some implementations, at least one of the VGAs includes a continuously-variable gain amplifier configured to amplify a signal received at the VGA with a gain proportional to the amplifier control signal.

In some implementations, the amplifiers 314a-314d are variable-current amplifiers (VCAs). The current drawn by a VCA may be bypassable, step-variable, continuously-variable. In some implementations, at least one of the VCAs includes a fixed-current amplifier and a bypass switch controllable by the amplifier control signal. The bypass switch may (in a first position) close a line between an input of the fixed-current amplifier to an output of fixed-current amplifier, allowing a signal to bypass the fixed-current amplifier. The bypass switch may (in a second position) open the line between the input and the output, passing a signal through the fixed-current amplifier. In some implementations, when the bypass switch is in the first position, the fixed-current amplifier is disabled or otherwise reconfigured to accommodate the bypass mode.

In some implementations, at least one of the VCAs includes a step-variable current amplifier configured to amplify the signal received at the VCA by drawing a current of one of plurality of configured amounts indicated by the amplifier control signal. In some implementations, at least one of the VCAs includes a continuously-variable current amplifier configured to amplify a signal received at the VCA by drawing a current proportional to the amplifier control signal.

In some implementations, the amplifiers 314a-314d are fixed-gain, fixed-current amplifiers. In some implementations, the amplifiers 314a-314d are fixed-gain, variable-current amplifiers. In some implementations, the amplifiers 314a-314d are variable-gain, fixed-current amplifiers. In some implementations, the amplifiers 314a-314d are variable-gain, variable-current amplifiers.

In some implementations, the DRx controller 302 generates the amplifier control signal(s) based on a quality of service metric of an input signal received at the input. In some implementations, the DRx controller 302 generates the amplifier control signal(s) based on a signal received from the communications controller 120, which may, in turn, be based on a quality of service (Qos) metric of the received signal. The QoS metric of the received signal may be based, at least in part, on the diversity signal received on the diversity antenna 140 (e.g., an input signal received at the input). The QoS metric of the received signal may be further based on a signal received on a primary antenna. In some implementations, the DRx controller 302 generates the amplifier control signal(s) based on a QoS metric of the diversity signal without receiving a signal from the communications controller 120.

In some implementations, the QoS metric includes a signal strength. As another example, the QoS metric may include a bit error rate, a data throughput, a transmission delay, or any other QoS metric.

As noted above, the DRx module 310 has an input that receives the diversity signal from the diversity antenna 140 and an output that provides a processed diversity signal to the transceiver 330 (via the transmission line 135 and the diversity RF module 320). The diversity RF module 320 receives the processed diversity signal via the transmission line 135 and performs further processing. In particular, the processed diversity signal is split or routed by a diversity RF multiplexer 321 to one or more paths on which the split or routed signal is filtered by corresponding bandpass filters 323a-323d and amplified by corresponding amplifiers 324a-324d. The output of each of the amplifiers 324a-324d is provided to the transceiver 330.

The diversity RF multiplexer 321 may be controlled by the controller 120 (either directly or via or an on-chip diversity RF controller) to selectively activate one or more of the paths. Similarly, the amplifiers 324a-324d may be controlled by the controller 120. For example, in some implementations, each of the amplifiers 324a-324d includes an enable/disable input and is enabled (or disabled) based on an amplifier enable signal. In some implementations, the amplifiers 324a-324d are variable-gain amplifiers (VGAs) that amplify a signal received at the VGA with a gain controlled by an amplifier control signal received from the controller 120 (or an on-chip diversity RF controller controlled by the controller 120). In some implementations, the amplifiers 324a-324d are variable-current amplifiers (VCAs).

With the DRx module 310 added to the receiver chain already including the diversity RF module 320, the number of bandpass filters in the DRx configuration 300 is doubled. Thus, in some implementations, bandpass filters 323a-323d are not included in the diversity RF module 320. Rather, the bandpass filters 313a-313d of the DRx module 310 are used to reduce the strength of out-of-band blockers. Further, the automatic gain control (AGC) table of the diversity RF module 320 may be shifted to reduce the amount of gain provided by the amplifiers 324a-324d of the diversity RF module 320 by the amount of the gain provided by the amplifiers 314a-314d of the DRx module 310.

For example, if the DRx module gain is 15 dB and the receiver sensitivity is −100 dBm, the diversity RF module 320 will see −85 dBm of sensitivity. If the closed-loop AGC of the diversity RF module 320 is active, its gain will drop by 15 dB automatically. However, both signal components and out-of-band blockers are received amplified by 15 dB. Thus, the 15 dB gain drop of the diversity RF module 320 may also be accompanied by a 15 dB increase in its linearity. In particular, the amplifiers 324a-324d of the diversity RF module 320 may be designed such that the linearity of the amplifiers increases with reduced gain (or increased current).

In some implementations, the controller 120 controls the gain (and/or current) of the amplifiers 314a-314d of the DRx module 310 and the amplifiers 324a-324d of the diversity RF module 320. As in the example above, the controller 120 may reduce an amount of gain provided by the amplifiers 324a-324d of the diversity RF module 320 in response to increasing an amount of gain provided by the amplifiers 314a-314d of the DRx module 310. Thus, in some implementations, the controller 120 is configured to generate a downstream amplifier control signal (for the amplifiers 324a-324d of the diversity RF module 320) based on the amplifier control signal (for the amplifiers 314a-314d of the DRx module 310) to control a gain of one or more downstream amplifiers 324a-324d coupled to the output (of the DRx module 310) via the transmission line 135. In some implementations, the controller 120 also controls the gain of other components of the wireless device, such as amplifiers in the front-end module (FEM), based on the amplifier control signal.

As noted above, in some implementations, the bandpass filters 323a-323d are not included. Thus, in some implementations, at least one of the downstream amplifiers 324a-324d are coupled to the output (of the DRx module 310) via the transmission line 135 without passing through a downstream bandpass filter.

Figure 4:
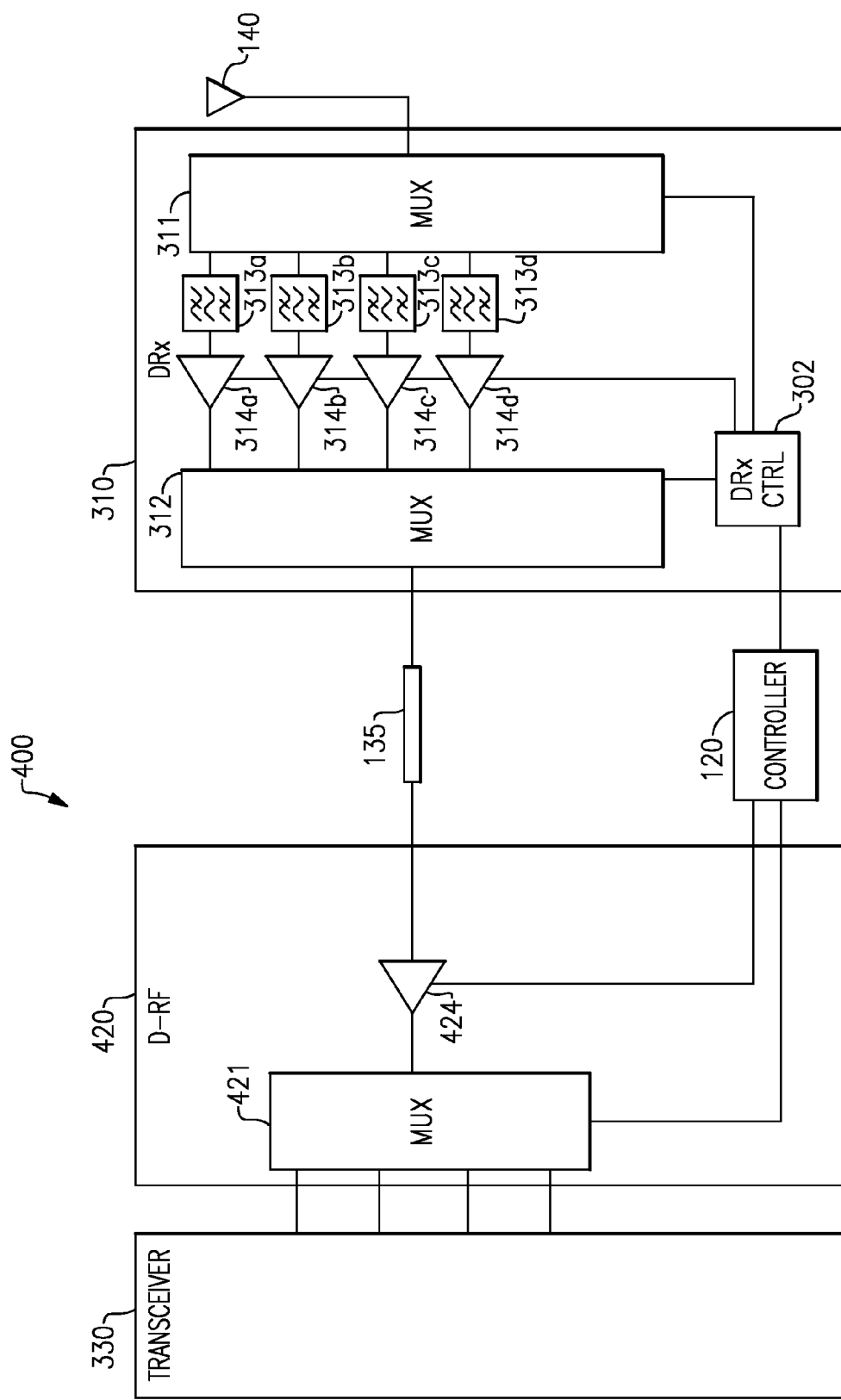
FIG. 4 shows that in some embodiments, a diversity receiver configuration may include a diversity RF module with fewer amplifiers than a diversity receiver (DRx) module.

FIG. 4 shows that in some embodiments, a diversity receiver configuration 400 may include a diversity RF module 420 with fewer amplifiers than a diversity receiver (DRx) module 310. The diversity receiver configuration 400 includes a diversity antenna 140 and a DRx module 310 as described above with respect to FIG. 3. The output of the DRx module 310 is passed, via a transmission line 135, to a diversity RF module 420 which differs from the diversity RF module 320 of FIG. 3 in that the diversity RF module 420 of FIG. 4 includes fewer amplifiers than the DRx module 310.

As mentioned above, in some implementations, the diversity RF module 420 does not include bandpass filters. Thus, in some implementations, the one or more amplifiers 424 of the diversity RF module 420 need not be band-specific. In particular, the diversity RF module 420 may include one or more paths, each including an amplifier 424, that are not mapped 1-to-1 with the paths DRx module 310. Such a mapping of paths (or corresponding amplifiers) may be stored in the controller 120.

Accordingly, whereas the DRx module 310 includes a number of paths, each corresponding to a frequency band, the diversity RF module 420 may include one or more paths that do not correspond to a single frequency band.

In some implementations (as shown in FIG. 4), the diversity RF module 420 includes a single wide-band amplifier 424 that amplifies the signal received from the transmission line 135 and outputs an amplified signal to a multiplexer 421. The multiplexer 421 includes a plurality of multiplexer outputs, each corresponding to a respective frequency band. In some implementations, the diversity RF module 420 does not include any amplifiers.

In some implementations, the diversity signal is a single-band signal. Thus, in some implementations, the multiplexer 421 is a SPMT switch that routes the diversity signal to one of the plurality of outputs corresponding to the frequency band of the single-band signal based on a signal received from the controller 120. In some implementations, the diversity signal is a multi-band signal. Thus, in some implementations, the multiplexer 421 is a signal splitter that routes the diversity signal to two or more of the plurality of outputs corresponding to the two or more frequency bands of the multi-band signal based on a splitter control signal received from the controller 120. In some implementations, diversity RF module 420 may be combined with the transceiver 330 as a single module.

In some implementations, the diversity RF module 420 includes multiple amplifiers, each corresponding to a set of frequency bands. The signal from the transmission line 135 may be fed into a band splitter that outputs high frequencies along a first path to a high-frequency amplifier and outputs low frequencies along a second path to a low-frequency amplifier. The output of each of the amplifiers may be provided to the multiplexer 421 which is configured to route the signal to the corresponding inputs of the transceiver 330.

Figure 5:
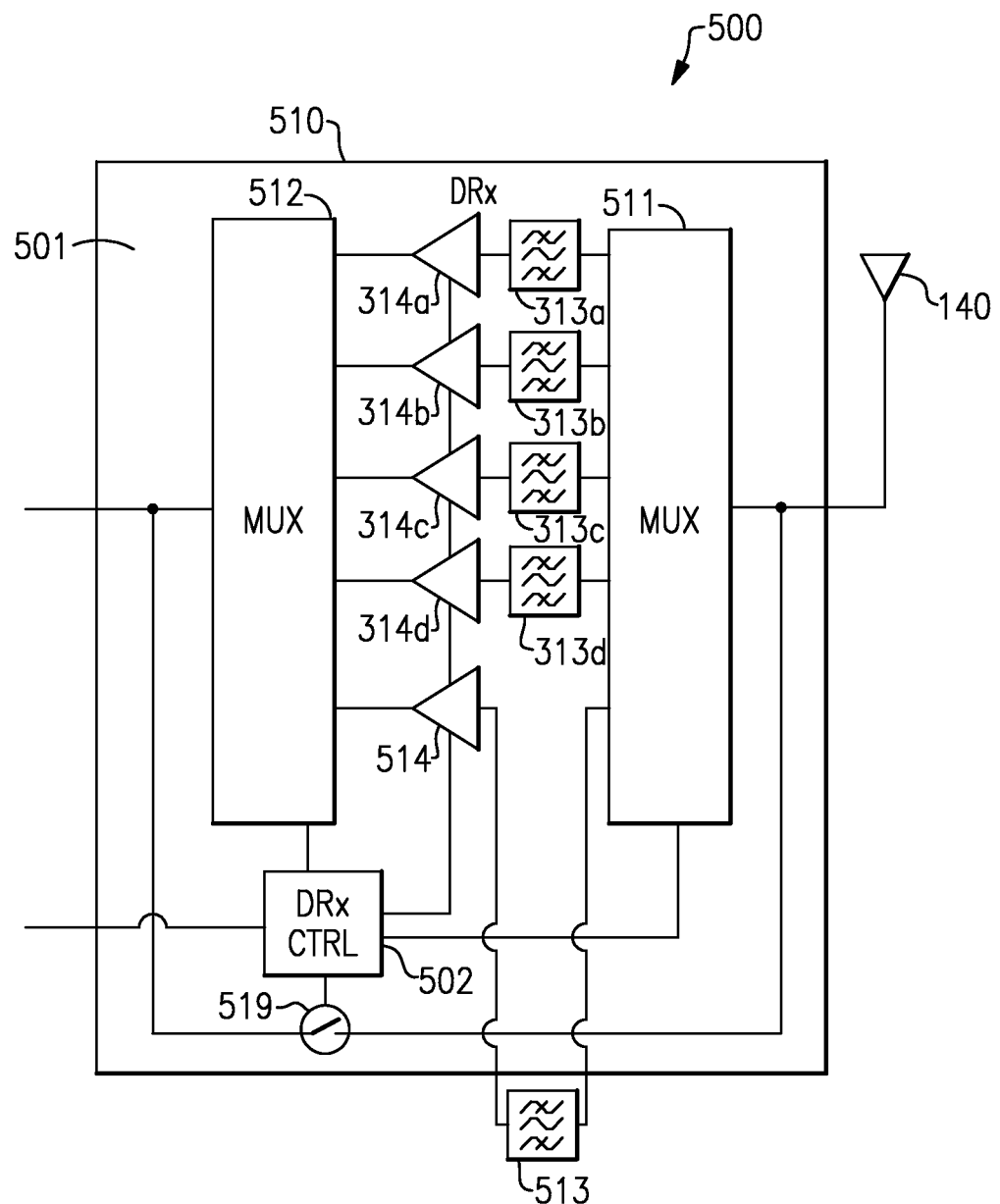
FIG. 5 shows that in some embodiments, a diversity receiver configuration may include a DRx module coupled to an off-module filter.

FIG. 5 shows that in some embodiments, a diversity receiver configuration 500 may include a DRx module 510 coupled to an off-module filter 513. The DRx module 510 may include a packaging substrate 501 configured to receive a plurality of components and a receiving system implemented on the packaging substrate 501. The DRx module 510 may include one or more signal paths that are routed off the DRx module 510 and made available to a system integrator, designer, or manufacturer to support a filter for any desired band.

The DRx module 510 includes a number of paths between the input and the output of the DRx module 510. The DRx module 510 includes a bypass path between the input and the output activated by a bypass switch 519 controlled by the DRx controller 502. Although FIG. 5 illustrates a single bypass switch 519, in some implementations, the bypass switch 519 may include multiple switches (e.g., a first switch disposed physically close to the input and a second switch disposed physically close to the output. As shown in FIG. 5, the bypass path does not include a filter or an amplifier.

The DRx module 510 includes a number of multiplexer paths including a first multiplexer 511 and a second multiplexer 512. The multiplexer paths include a number of on-module paths that include the first multiplexer 511, a bandpass filter 313a-313d implemented on the packaging substrate 501, an amplifier 314a-314d implemented on the packaging substrate 501, and the second multiplexer 512. The multiplexer paths include one or more off-module paths that include the first multiplexer 511, a bandpass filter 513 implemented off the packaging substrate 501, an amplifier 514, and the second multiplexer 512. The amplifier 514 may be a wide-band amplifier implemented on the packaging substrate 501 or may also be implemented off the packaging substrate 501. As described above, the amplifiers 314a-314d, 514 may be variable-gain amplifiers and/or variable-current amplifiers.

The DRx controller 502 is configured to selectively activate one or more of the plurality of paths between the input and the output. In some implementations, the DRx controller 502 is configured to selectively activate one or more of the plurality of paths based on a band select signal received by the DRx controller 502 (e.g., from a communications controller). The DRx controller 502 may selectively activate the paths by, for example, opening or closing the bypass switch 519, enabling or disabling the amplifiers 314a-314d, 514, controlling the multiplexers 511, 512, or through other mechanisms. For example, the DRx controller 502 may open or close switches along the paths (e.g., between the filters 313a-313d, 513 and the amplifiers 314a-314d, 514) or by setting the gain of the amplifiers 314a-314d, 514 to substantially zero.

Figure 6:
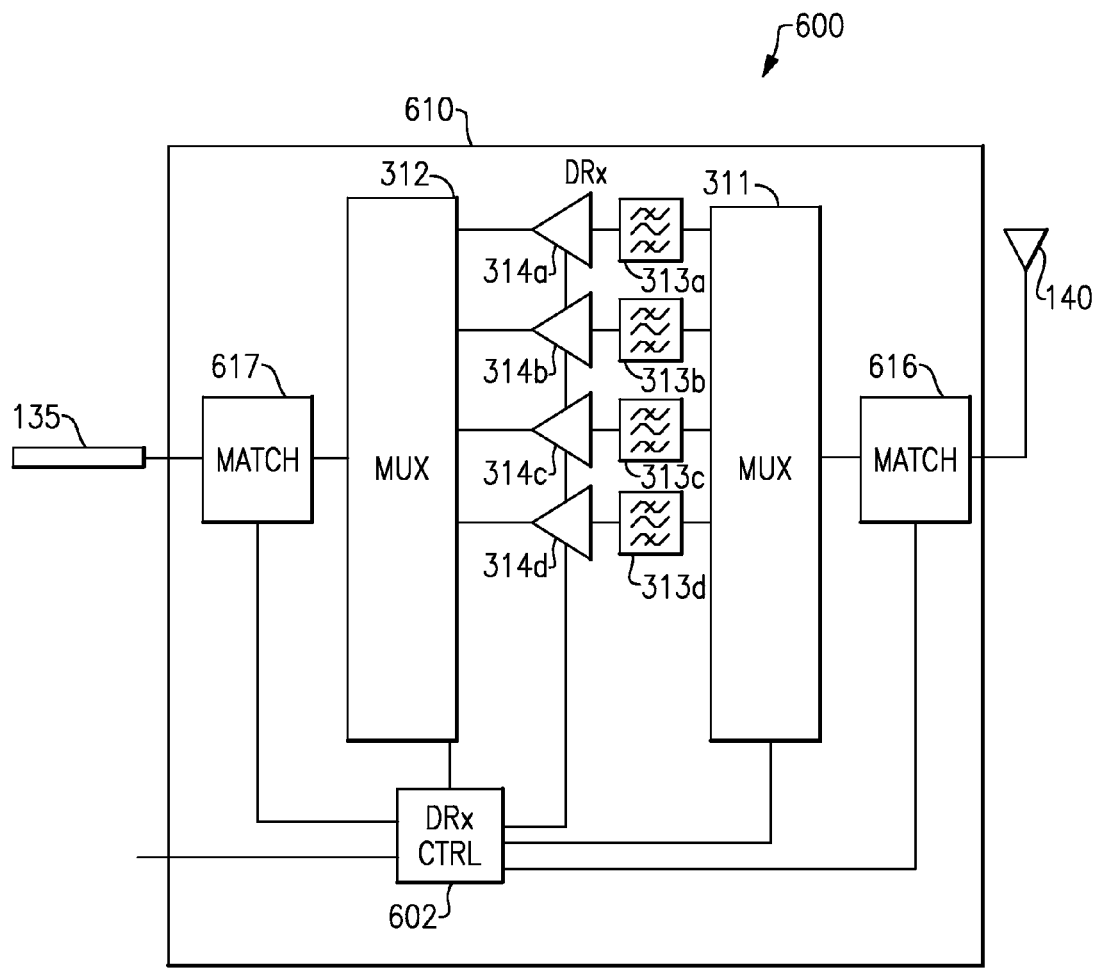
FIG. 6 shows that in some embodiments, a diversity receiver configuration may include a DRx module with tunable matching circuits.

FIG. 6 shows that in some embodiments, a diversity receiver configuration 600 may include a DRx module 610 with tunable matching circuits. In particular, the DRx module 610 may include one or more tunable matching circuits disposed at one or more of the input and the output of the DRx module 610.

Multiple frequency bands received on the same diversity antenna 140 are unlikely to all see an ideal impedance match. To match each frequency band using a compact matching circuit, a tunable input matching circuit 616 may be implemented at the input of the DRx module 610 and controlled by the DRx controller 602 (e.g., based on a band select signal from a communications controller). The DRx controller 602 may tune the tunable input matching circuit 616 based on a lookup table that associates frequency bands (or sets of frequency bands) with tuning parameters. The tunable input matching circuit 616 may be a tunable T-circuit, a tunable PI-circuit, or any other tunable matching circuit. In particular, the tunable input matching circuit 616 may include one or more variable components, such as resistors, inductors, and capacitors. The variable components may be connected in parallel and/or in series and may be connected between the input of the DRx module 610 and the input of the first multiplexer 311 or may be connected between the input of the DRx module 610 and a ground voltage.

Similarly, with only one transmission line 135 (or, at least, few cables) carrying signals of many frequency bands, it is not likely that multiple frequency bands will all see an ideal impedance match. To match each frequency band using a compact matching circuit, a tunable output matching circuit 617 may be implemented at the output of the DRx module 610 and controlled by the DRx controller 602 (e.g., based on a band select signal from a communications controller). The DRx controller 602 may tune the tunable output matching circuit 618 based on a lookup table that associates frequency bands (or sets of frequency bands) with tuning parameters. The tunable output matching circuit 617 may be a tunable T-circuit, a tunable PI-circuit, or any other tunable matching circuit. In particular, the tunable output matching circuit 617 may include one or more variable components, such as resistors, inductors, and capacitors. The variable components may be connected in parallel and/or in series and may be connected between the output of the DRx module 610 and the output of the second multiplexer 312 or may be connected between the output of the DRx module 610 and a ground voltage.

Figure 7:
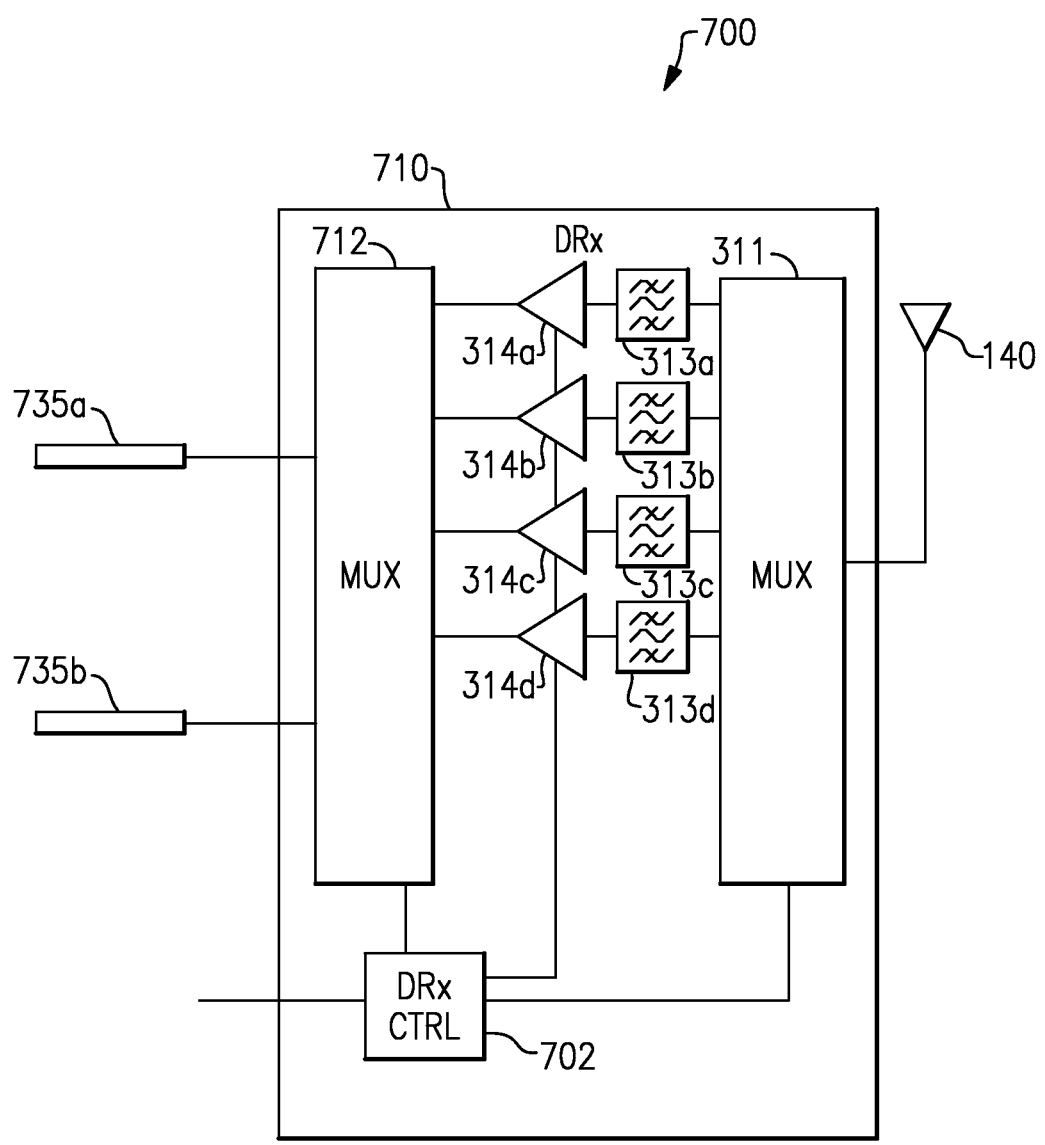
FIG. 7 shows that in some embodiments, a diversity receiver configuration may include multiple transmission lines.

FIG. 7 shows that in some embodiments, a diversity receiver configuration 700 may include multiple transmission lines. Although FIG. 7 illustrates an embodiment with two transmission lines 735a-735b and one antenna 140, aspects described herein may be implemented in embodiments with more than two transmission lines and/or (as described further below) two or more antennas.

The diversity receiver configuration 700 includes a DRx module 710 coupled to an antenna 140. The DRx module 710 includes a number of paths between an input of the DRx module 710 (e.g, the input coupled to the antenna 140a) and an output of the DRx module (e.g., the first output coupled to the first transmission line 735a or the second output coupled to the second transmission line 735b). In some implementations, the DRx module 710 includes one or more bypass paths (not shown) between the input and the outputs activated by one or more bypass switches controlled by the DRx controller 702.

The DRx module 710 includes a number of multiplexer paths including an input multiplexer 311 and an output multiplexer 712. The multiplexer paths include a number of on-module paths (shown) that include the input multiplexer 311, a bandpass filter 313a-313d, an amplifier 314a-314d, and the output multiplexer 712. The multiplexer paths may include one or more off-module paths (not shown) as described above. As also described above, the amplifiers 314a-314d may be variable-gain amplifiers and/or variable-current amplifiers.

The DRx controller 702 is configured to selectively activate one or more of the plurality of paths. In some implementations, the DRx controller 702 is configured to selectively activate one or more of the plurality of paths based on a band select signal received by the DRx controller 702 (e.g., from a communications controller). The DRx controller 702 may selectively activate the paths by, for example, enabling or disabling the amplifiers 314a-314d, controlling the multiplexers 311, 712, or through other mechanisms as described above.

To better utilize the multiple transmission lines 735a-735b, the DRx controller 702 can, based on the band select signal, control the output multiplexer 712 to route each of the signals propagating along the paths to a selected one of the transmission lines 735a-735b (or output multiplexer outputs corresponding to the transmission lines 735a-735b).

In some implementations, if the band select signal indicates that the received signal includes a single frequency band, the DRx controller 702 can control the output multiplexer 712 to route the signal propagating on the corresponding path to a default transmission line. The default transmission line can be the same for all paths (and corresponding frequency bands), such as when one of the transmission lines 735a-735b is shorter, introduces less noise, or is otherwise preferred. The default transmission line can be different for different paths. For example, paths corresponding to low frequency bands can be routed to the first transmission line 735b and paths corresponding to high frequency bands can be routed to the second transmission line 735b.

Thus, in response to a band select signal indicating that one or more RF signals received at the input multiplexer 311 includes a single frequency band, the DRx controller 702 can be configured to control the second multiplexer 712 to route an amplified RF signal received at an output multiplexer input corresponding to the single frequency band to a default output multiplexer output. As noted above, the default output multiplexer output can be different for different single frequency bands or the same for all frequency bands.

In some implementations, if the band select signal indicates that the received signal includes two frequency bands, the DRx controller 702 can control the output multiplexer 712 to route a signal propagating along a path corresponding to the first frequency band to the first transmission line 735a and route the signal propagating along a path corresponding to the second frequency band to the second transmission line 735b. Thus, even if both of the two frequency bands are high frequency bands (or low frequency bands), the signals propagating along the corresponding paths may be routed to different transmission lines. Similarly, in the case of three or more transmission lines, each of three or more frequency bands can be routed to different transmission lines.

Thus, in response to a band select signal indicating that one or more RF signals received at the input multiplexer 311 includes a first frequency band and a second frequency band, the DRX controller 702 can be configured to control the second multiplexer 712 to route an amplified RF signal received at an output multiplexer input corresponding to the first frequency band to a first output multiplexer output and to route an amplified RF signal received at an output multiplexer input corresponding to the second frequency band to a second output multiplexer output. As noted above, both the first frequency band and the second frequency band can be high frequency band or low frequency bands.

In some implementations, if the band select signal indicates that the received signal includes three frequency bands, the DRx controller 702 can control the output multiplexer 712 to combine two of the signals propagating along two paths corresponding to two of the frequency bands and route the combined signal along one of the transmission lines and to route the signal propagating along the path corresponding to the third frequency band along the other of the transmission lines. In some implementations, the DRx controller 702 controls the output multiplexer 712 to combine the two of the three frequency bands that are closest together (e.g., both low frequency bands or both high frequency bands). Such implementations may simplify impedance matching at the output of the DRx module 710 or the input of the downstream module. In some implementations, the DRx controller 702 controls the output multiplexer 712 to combine the two of the three frequency bands that are furthest apart. Such implementations may simplify separation of the frequency bands at the downstream module.

Thus, in response to a band select signal indicating that one or more RF signals received at the input multiplexer 311 includes a first frequency band a second frequency band, and a third frequency band, the DRx controller 702 can be configured to control the second multiplexer 712 (a) to combine an amplified RF signal received at an output multiplexer input corresponding to the first frequency band and an amplified RF signal received at an output multiplexer input corresponding to the second frequency band to generate a combined signal, (b) to route the combined signal to a first output multiplexer output, and (c) to route an amplified RF signal received at an output multiplexer input corresponding to the third frequency band to a second output multiplexer output. As noted above, the first frequency band and the second frequency band may be those of the three frequency bands that are closest together or furthest apart.

In some implementations, if the band select signal indicates that the received signal includes four frequency bands, the DRx controller 702 can control the output multiplexer 712 to combine two of the signals propagating along two paths corresponding to two of the frequency bands and route the first combined signal along one of the transmission lines and route two of the signals propagating along two paths corresponding to the other two of the frequency bands and route the second combined signal along the other of the transmission lines. In some implementations, the DRx controller 702 can control the output multiplexer 712 to combine three of the signals propagating along three paths corresponding to three of the frequency bands and route the combined signal along one of the transmission lines and route the signal propagating along the path corresponding to the fourth frequency band along the other of the transmission lines. Such an implementation may be beneficial when three of the frequency bands are close together (e.g., all low frequency bands) and the fourth frequency band is far apart (e.g., a high frequency band).

In general, if the band select signal indicates that the received signal includes more frequency bands than there are transmission lines, the DRx controller 702 can control the output multiplexer 712 to combine two or more of the signals propagating along two or more paths corresponding to two or more of the frequency bands and route the combined signal to one of the transmission lines. The DRx controller 702 can control the output multiplexer 712 to combine frequency bands that are closest together or furthest apart.

Thus, a signal propagating along one of the paths may be routed by the output multiplexer 712 to a different one of the transmission lines depending on other signals that are propagating along other path. As an example, a signal propagating along a third path passing through the third amplifier 314c may be routed to the second transmission line 735b when the third path is the only active path and routed to the first transmission line 735a when the fourth path (passing through the fourth amplifier 314d) is also active (and routed to the second transmission line 735b).

Thus, the DRx controller 702 can be configured to, in response to a first band select signal, control the output multiplexer 712 to route an amplified RF signal received at an output multiplexer input to a first output multiplexer output and, in response to a second band select signal, control the output multiplexer to route an amplified RF signal received at the output multiplexer input to a second output multiplexer output.

Thus, the DRx module 710 constitutes a receiving system including a plurality of amplifiers 314a-314d, each one of the plurality of amplifiers 314a-314d disposed along a corresponding one of a plurality of paths between an input of the receiving system (e.g., the input of the DRx module 710 coupled to the antenna 140 and/or additional inputs of the DRx module 710 coupled to other antennas) and an output of the receiving system (e.g., the outputs of the DRx module 710 coupled to the transmission lines 735a-735b and/or additional outputs of the DRx module 710 coupled to other transmission lines). Each of the amplifiers 314a-314d are configured to amplify an RF signal received at the amplifier 314a-314d.

The DRx module 710 further includes an input multiplexer 311 configured to receive one or more RF signals at one or more input multiplexer inputs and to output each of the one or more RF signals to one or more of a plurality of input multiplexer outputs to propagate along a respective one or more of the plurality of paths. In some implementations, the DRx module 710 receives a single RF signal at a single input multiplexer input and is controlled by the DRx controller 702 to output the single RF signal to one or more of the input multiplexer outputs corresponding to each frequency band indicated in a band select signal. In some implementations, the DRx module 710 receives multiple RF signals (each corresponding to a different set of one or more frequency bands indicated in a band select signal) at multiple input multiplexer inputs and is controlled by the DRx controller 702 to output each of the multiple RF signals to one or more of the input multiplexer outputs corresponding to the set of one or more frequency bands of the respective RF signal. Thus, in general, the input multiplexer 311 receives one or more RF signals, each corresponding to one or more frequency bands, and is controlled by the DRx controller to route each RF signal along the one or more paths corresponding to the one or more frequency bands of the RF signal.

The DRx module 710 further includes an output multiplexer 712 configured to receive one or more amplified RF signals propagating along the respective one or more of the plurality of paths at one or more respective output multiplexer inputs and to output each of the one or more amplified RF signals to a selected one of a plurality of output multiplexer outputs (each respectively coupled to one of a plurality of output transmission lines 735a-735b).

The DRx module 710 further includes a DRx controller 702 configured to receive a band select signal and, based on the band select signal, control the input multiplexer and the output multiplexer. As described above, the DRx controller 702 controls the input multiplexer to route each of one or more RF signals corresponding to one or more frequency bands along the one or more paths corresponding to the one or more frequency bands of the RF signal. As also described above, the DRx controller 702 controls the output multiplexer to route each of one or more amplified RF signals propagating along one or more paths to a selected one of a plurality of output multiplexer outputs in order to better utilize the transmission lines 735a-735b coupled to the DRx module 710.

In some implementations, if the band select signal indicates that the received signal includes multiple frequency bands, the DRx controller 702 can control the output multiplexer 712 to combine all of the signals propagating along paths corresponding to multiple frequency bands and route the combined signal to one of the transmission lines. Such implementations may be used when other transmission lines are unusable (e.g., damaged or not present in a particular wireless communication configuration) and be implemented in response to a controller signal received by the DRx controller 702 (e.g, from a communications controller) that one of the transmission lines is unusable.

Thus, in response to a band select signal indicating that one or more RF signals received at the input multiplexer 311 includes multiple frequency bands and in response to a controller signal indicating that a transmission line is unusable, the DRx controller 702 can be configured to control the output multiplexer 712 to combine multiple amplified RF signals received at multiple output multiplexer inputs corresponding to the multiple frequency bands to generate a combined signal and to route the combined signal to a output multiplexer output.

Figure 8:
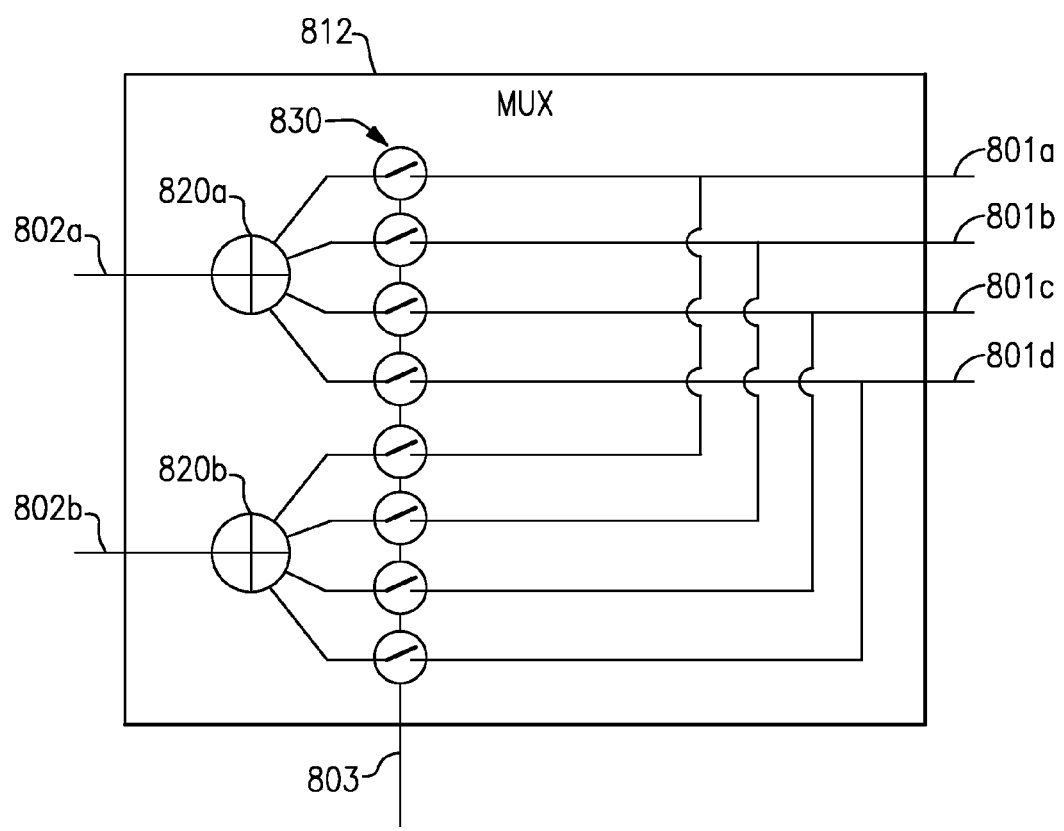
FIG. 8 shows an embodiment of an output multiplexer that may be used for dynamic routing.

FIG. 8 shows an embodiment of an output multiplexer 812 that may be used for dynamic routing. The output multiplexer 812 includes a plurality of inputs 801a-801d that may be respectively coupled to amplifiers disposed along a plurality of paths corresponding to a plurality of frequency bands. The output multiplexer 812 includes a plurality of outputs 802a-802b that may be respectively coupled to a plurality of transmission lines. Each of the outputs 802a-802b is coupled to an output of a respective combiner 820a-820b. Each of the inputs 801a-801d is coupled, via one of a set of single-pole/single-throw (SPST) switches 830 to an input of each of the combiners 820a-820b. The switches 830 are controllable via a control bus 803 that may be coupled to a DRx controller.

Figure 9:
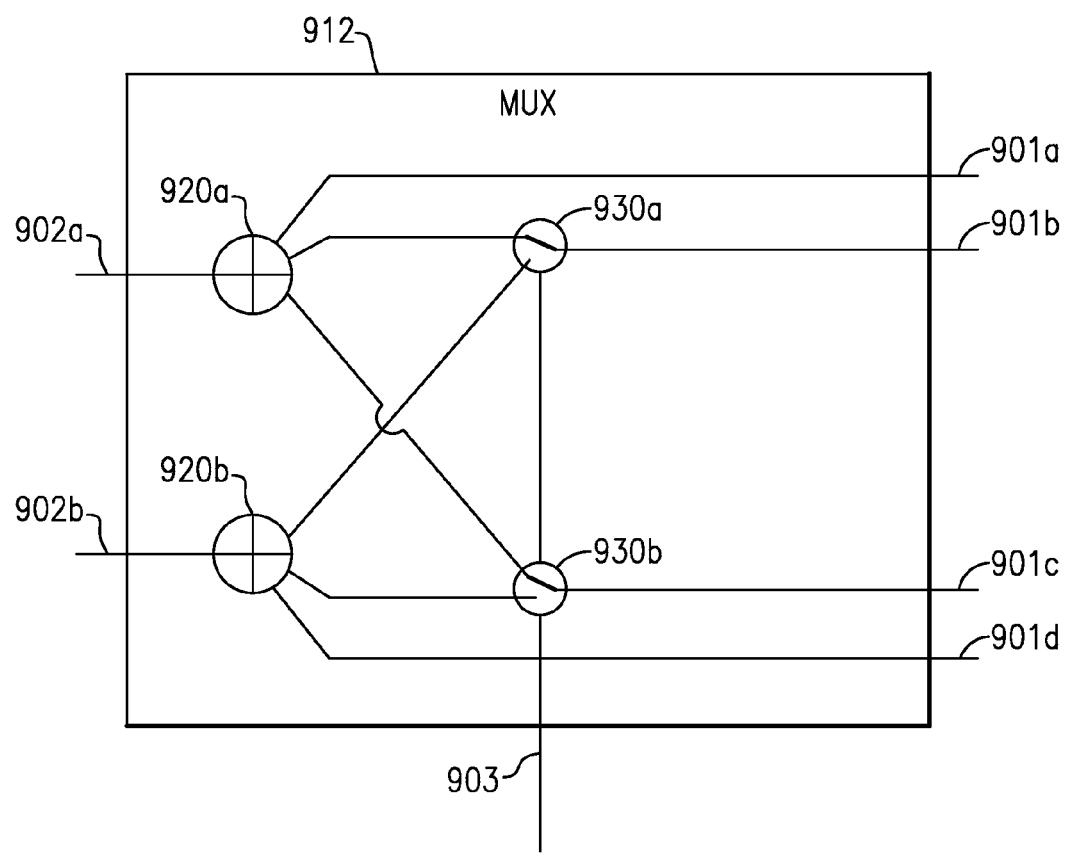
FIG. 9 shows another embodiment of an output multiplexer that may be used for dynamic routing.

FIG. 9 shows another embodiment of an output multiplexer 912 that may be used for dynamic routing. The output multiplexer 912 includes a plurality of inputs 901a-901d that may be respectively coupled to amplifiers disposed along a plurality of paths corresponding to a plurality of frequency bands. The output multiplexer 912 includes a plurality of outputs 902a-902b that may be respectively coupled to a plurality of transmission lines. Each of the outputs 902a-902b is coupled to an output of a respective combiner 920a-920b. The first input 901a is coupled to an input of the first combiner 920a and the fourth input 901d is coupled to an input of the second combiner 920d. The second input 901b is coupled to a first single-pole/multiple-throw (SPMT) switch 930a having outputs coupled to each of the combiners 920a-920b. Similarly, the third input 901c is coupled to second SPMT switch 930b having outputs coupled to each of the combiners 920a-920b. The switches 930a-930b are controllable via a control bus 903 that may be coupled to a DRx controller.

Unlike the output multiplexer 812 of FIG. 8, the output multiplexer 912 of FIG. 9 does not allow each input 901a-901d to be routed to any of the outputs 902a-902b. Rather, the first input 901a is fixedly routed to the first output 902a and the fourth input 902d is fixedly routed to the second output 902b. Such an implementation may reduce the size of the control bus 903 or simplify the control logic of the DRx controller attached to the control bus 903.

Both the output multiplexer 812 of FIG. 8 and the output multiplexer 912 of FIG. 9 include a first combiner 820a, 920a coupled to a first output multiplexer output 802a, 902a and a second combiner 820b, 920b coupled to a second output multiplexer output 802b, 902b. Further, both the output multiplexer 812 of FIG. 8 and the output multiplexer 912 of FIG. 9 include an output multiplexer input 801b, 901b coupled to both the first combiner 820a, 920a and the second combiner 820*b*, 920*b* via one or more switches (controlled by the DRx controller). In the output multiplexer 812 of FIG. 8, the output multiplexer input 801*b* is coupled to the first combiner 820*a* and the second combiner 820*b* via two SPST switches. In the output multiplexer 912 of FIG. 9, the output multiplexer input 901*b* is coupled to the first combiner 920*a* and the second combiner 820*b* via a single SPMT switch.

Figure 10:
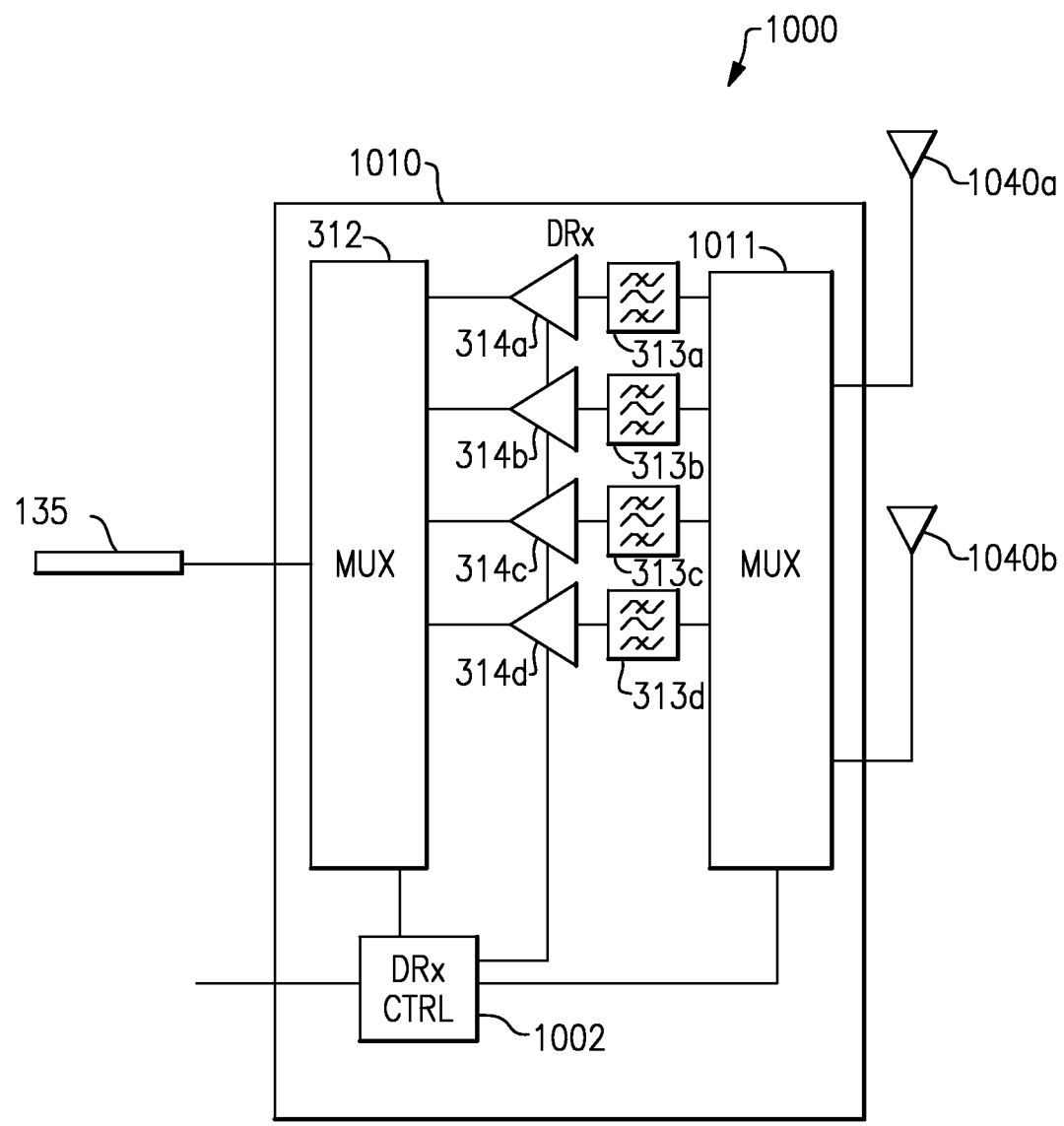
FIG. 10 shows that in some embodiments, a diversity receiver configuration may include multiple antennas.

FIG. 10 shows that in some embodiments, a diversity receiver configuration 1000 may include multiple antennas 1040*a*-1040*b*. Although FIG. 10 illustrates an embodiment with one transmission line 135 and two antennas 1040*a*-1040*b*, aspects described herein may be implemented in embodiments with two or more transmission lines and/or more than two antennas.

The diversity receiver configuration 1000 includes a DRx module 1010 coupled to a first antenna 1040*a* and a second antenna 1040*b*. The DRx module 1010 includes a number of paths between an input of the DRx module 1010 (e.g, the first input coupled to the first antenna 1040*a* or the second input coupled to the second antenna 1040*b*) and an output of the DRx module (e.g., the output coupled to the transmission line 135). In some implementations, the DRx module 1010 includes one or more bypass paths (not shown) between the inputs and the output activated by one or more bypass switches controlled by the DRx controller 1002.

The DRx module 1010 includes a number of multiplexer paths including an input multiplexer 1011 and an output multiplexer 312. The multiplexer paths include a number of on-module paths (shown) that include the input multiplexer 1011, a bandpass filter 313*a*-313*d*, an amplifier 314*a*-314*d*, and the output multiplexer 312. The multiplexer paths may include one or more off-module paths (not shown) as described above. As also described above, the amplifiers 314*a*-314*d* may be variable-gain amplifiers and/or variable-current amplifiers.

The DRx controller 1002 is configured to selectively activate one or more of the plurality of paths. In some implementations, the DRx controller 1002 is configured to selectively activate one or more of the plurality of paths based on a band select signal received by the DRx controller 1002 (e.g., from a communications controller). The DRx controller 1002 may selectively activate the paths by, for example, enabling or disabling the amplifiers 314*a*-314*d*, controlling the multiplexers 1011, 312, or through other mechanisms as described above.

In various diversity receiver configurations, the antennas 1040*a*-1040*b* may support various frequency bands. For example, in one implementation, a diversity receiver configuration could include a first antenna 1040*a* that supports low frequency bands and mid frequency bands and a second antenna 1040*b* that supports high frequency bands. Another diversity receiver configuration could include a first antenna 1040*a* that supports low frequency bands and a second antenna 1040*b* that supports mid frequency bands and high frequency bands. Yet another diversity receiver configuration could include only a first wideband antenna 1040*a* that supports low frequency bands, mid frequency bands, and high frequency bands and may lack a second antenna 1040*b*.

The same DRx module 1010 can be used for all of these diversity receiver configurations through control of the input multiplexer 1011 by the DRx controller 1002 based on an antenna configuration signal (e.g., received from a communications controller or stored in and read from a permanent memory or other hardwired configuration).

In some implementations, when the antenna configuration signal indicates that the diversity receiver configuration 1000 includes only a single antenna 1040*a*, the DRx controller 1002 can control the input multiplexer to route the signal received at the single antenna 1040*a* to all of the paths (or all of the active paths as indicated by a band select signal).

Thus, in response to an antenna configuration signal indicating that that the diversity receiver configuration includes a single antenna, the DRx controller 1002 can be configured to control the input multiplexer to route an RF signal received at a single input multiplexer input to all of the plurality of input multiplexer outputs or to all of the plurality of input multiplexer outputs associated with the one or more frequency bands of the RF signal.

In some implementations, when the antenna configuration signal indicates that the diversity receiver configuration 1000 includes a first antenna 1040*a* that supports low frequency bands and a second antenna 1040*b* that supports mid frequency bands and high frequency bands, the DRx controller 1002 can control the input multiplexer 1011 to route the signal received at the first antenna 1040*a* to the first path (including the first amplifier 314*a*) and to route the signal received at the second antenna 1040*b* to the second path (including the second amplifier 314*b*), the third path (including the third amplifier 314*c*), and the fourth path (including the fourth amplifier 314*d*), or at least those of the paths that are active as indicated by a band select signal.

In some implementations, when the antenna configuration signal indicates that the diversity receiver configuration 1000 includes a first antenna 1040*a* that supports low frequency bands and lower mid frequency bands and a second antenna 1040*b* that supports higher mid frequency bands and high frequency bands, the DRx controller 1002 can control the input multiplexer 1011 to route the signal received at the first antenna 1040*a* to the first path and the second path and to route the signal received at the second antenna 1040*b* to the third path and the fourth path, or at least those of the paths that are active as indicated by a band select signal.

In some implementations, when the antenna configuration signal indicates that the diversity receiver configuration 1000 includes a first antenna 1040*a* that supports low frequency bands and mid frequency bands and a second antenna 1040*b* that supports high frequency bands, the DRx controller 1002 can control the input multiplexer 1011 to route the signal received at the first antenna 1040*a* to the first path, the second path, and the third path, and to route the signal received at the second antenna 1040*b* to the fourth path, or at least those of the paths that are active as indicated by a band select signal.

Thus, the signal propagating along a particular path (e.g., the third path) may be routed by the input multiplexer 1011 from different ones of the input multiplexer inputs (coupled to one of the antennas 1040*a*-1040*b*) depending on the diversity receiver configuration (as indicated by the antenna configuration signal).

Thus, the DRx controller 1002 can be configured to, in response to a first antenna configuration signal, control the input multiplexer 1011 to route an RF signal received at a first input multiplexer input to an input multiplexer output and, in response to a second antenna configuration signal, control the input multiplexer 1011 to route an RF signal received at a second input multiplexer input to the input multiplexer output.

In general, the DRx controller 1002 can be configured to control the input multiplexer 1011 so as to route received signals, each including one or more frequency bands, along the paths corresponding to the one or more frequency bands.

In some implementations, the input multiplexer 1011 can further act as a band splitter that outputs each of one or more frequency bands along the paths corresponding to the one or more frequency bands. As an example, the input multiplexer 1011 and bandpass filters 313a-313d constitute such a band splitter. In other implementations (as described further below), the bandpass filters 313a-313d and input multiplexer 1011 can be integrated in other ways to form a band splitter.

Figure 11:
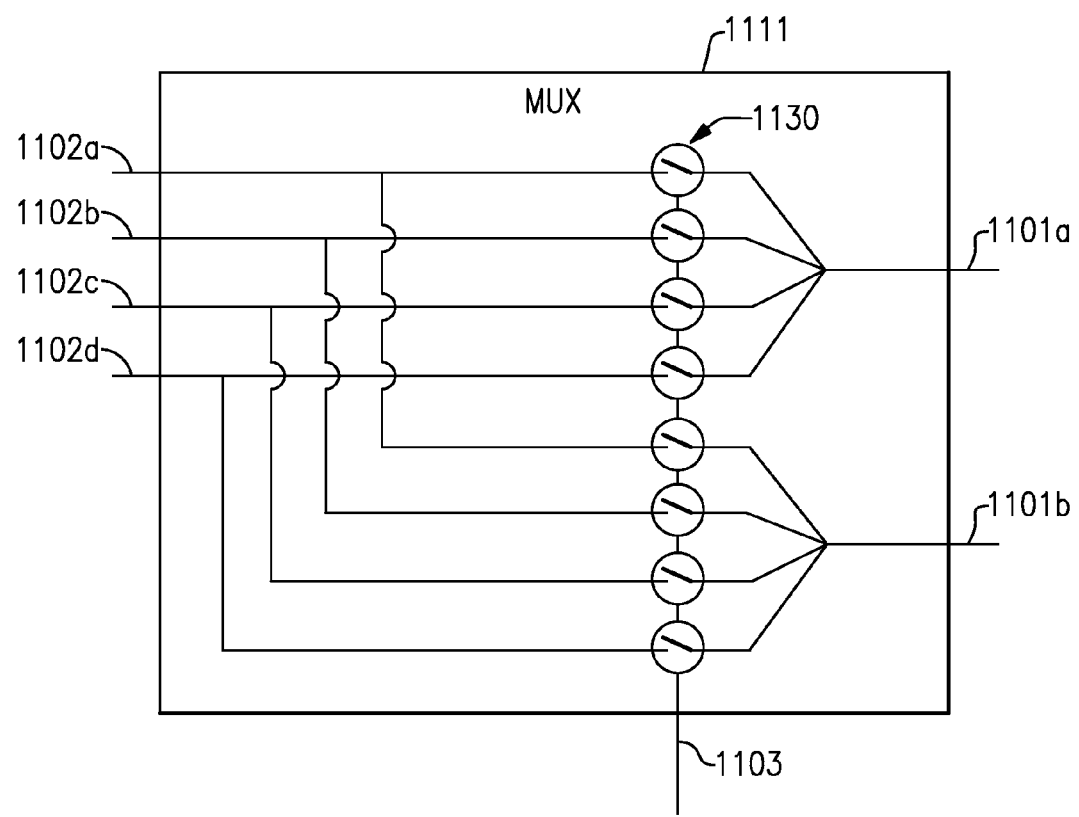
FIG. 11 shows an embodiment of an input multiplexer that may be used for dynamic routing.

FIG. 11 shows an embodiment of an input multiplexer 1111 that may be used for dynamic routing. The input multiplexer 1111 includes a plurality of inputs 1101a-1101b that may be respectively coupled to one or more antennas. The input multiplexer 1111 includes a plurality of outputs 1102a-1102d that may be respectively coupled to the amplifiers disposed along a plurality of paths corresponding to a plurality of frequency bands (e.g., via bandpass filters). Each of the inputs 1101a-1101b is coupled, via one of a set of single-pole/single-throw (SPST) switches 1130, to each of the outputs 1102a-1102d. The switches 1130 are controllable via a control bus 1103 that may be coupled to a DRx controller.

Figure 12:
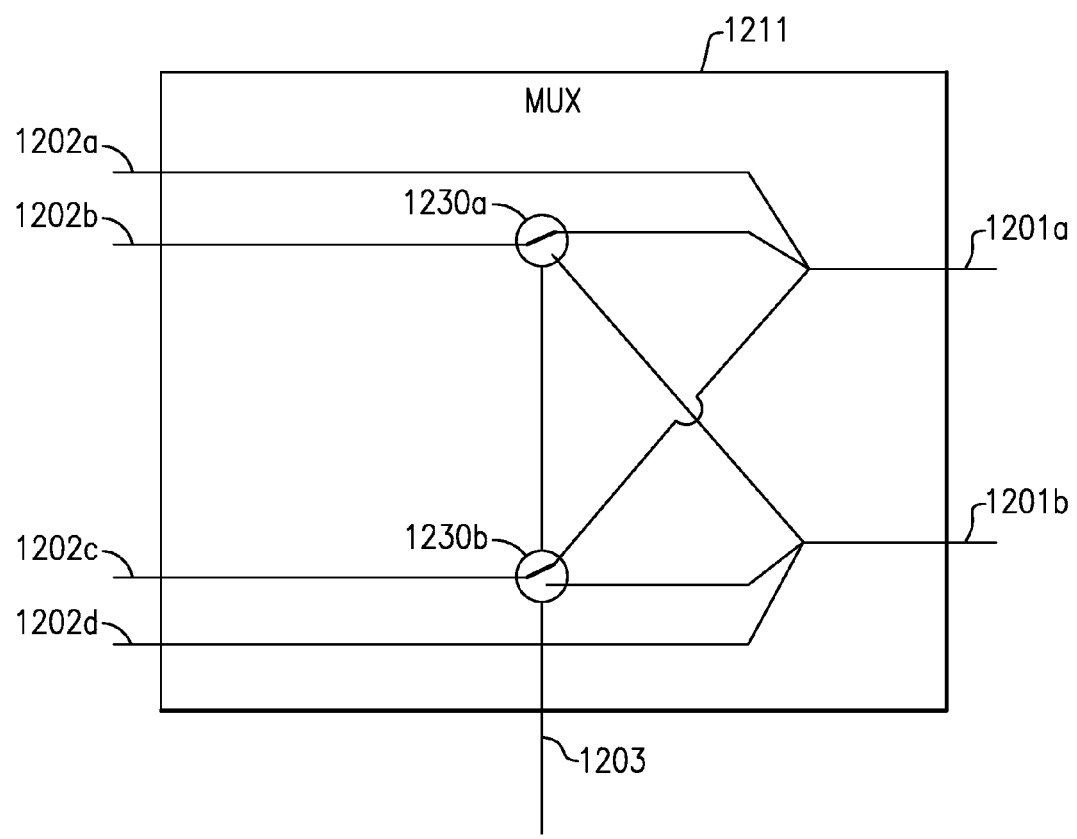
FIG. 12 shows another embodiment of an input multiplexer that may be used for dynamic routing.

FIG. 12 shows another embodiment of an input multiplexer 1211 that may be used for dynamic routing. The input multiplexer 1211 includes a plurality of inputs 1201a-1201b that may be respectively coupled to one or more antennas. The input multiplexer 1211 includes a plurality of outputs 1202a-1202d that may be respectively coupled to the amplifiers disposed along a plurality of paths corresponding to a plurality of frequency bands (e.g., via bandpass filters). The first input 1201a is coupled to the first output 1202a, a first multiple-pole/single-throw (MPST) switch 1230a, and a second MPST switch 1230b. The second input 1201b is coupled to the first MPST switch 1230a, the second MPST switch 1230b, and the fourth output 1202d. The switches 1230a-1230b are controllable via a control bus 1203 that may be coupled to a DRx controller.

Unlike the input multiplexer 1111 of FIG. 11, the output multiplexer 1211 of FIG. 12 does not allow each input 1201a-1201b to be routed to any of the outputs 1202a-1202d. Rather, the first input 1201a is fixedly routed to the first output 1202a and the second input 1201b is fixedly routed to the fourth output 1202d. Such an implementation may reduce the size of the control bus 903 or simplify the control logic of the DRx controller attached to the control bus 903. Nevertheless, based on the antenna configuration signal, the DRx controller can control the switches 1230a-1230b to route the signal from either of the inputs 1201a-1201b to the second output 1202b and/or the third output 1202c.

Both the input multiplexer 1111 of FIG. 11 and the input multiplexer 1211 of FIG. 12 operate as multi-pole/multi-throw (MPMT) switches. In some implementations, the input multiplexers 1111, 1211 include filters or match components to reduce insertion loss. Such filters or match components can be co-designed with other components of a DRx module (e.g., bandpass filters 313a-313d of FIG. 10). For example, the input multiplexer and bandpass filters can be integrated as a single part to reduce the number of total components. As another example, the input multiplexer can be designed for a particular output impedance (e.g., one that is not 50 Ohms) and the bandpass filters can be designed to match this impedance.

Figure 13A:
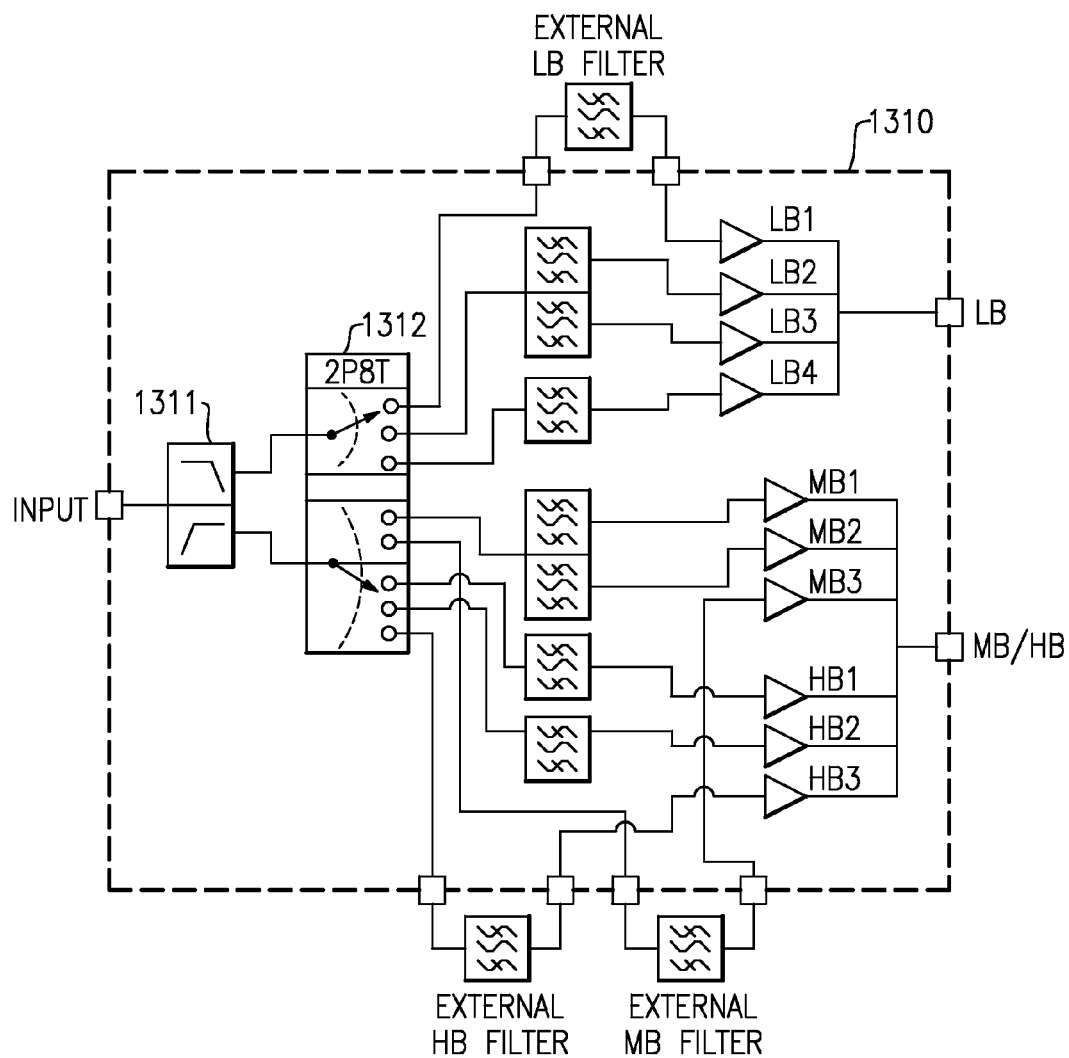
FIG. 13A-13F show various implementations of a DRx module with dynamic input routing and/or output routing.

FIG. 13A-13F show various implementations of a DRx module with dynamic input routing and/or output routing. FIG. 13A shows that, in some embodiments, a DRx module 1310 can include a single input and two outputs. The DRx module 1310 includes, as a band splitter, a high-low diplexer 1311 that splits an input signal into low frequency bands and mid and high frequency bands, a two-pole/eight-throw switch 1312 (implemented as a first single-pole/three-throw switch and a second single-pole/five-throw switch), and various filters and band-split diplexers. As described above, the high-low diplexer 1311 and the various filters and band-split diplexers can be co-designed.

Figure 13B:
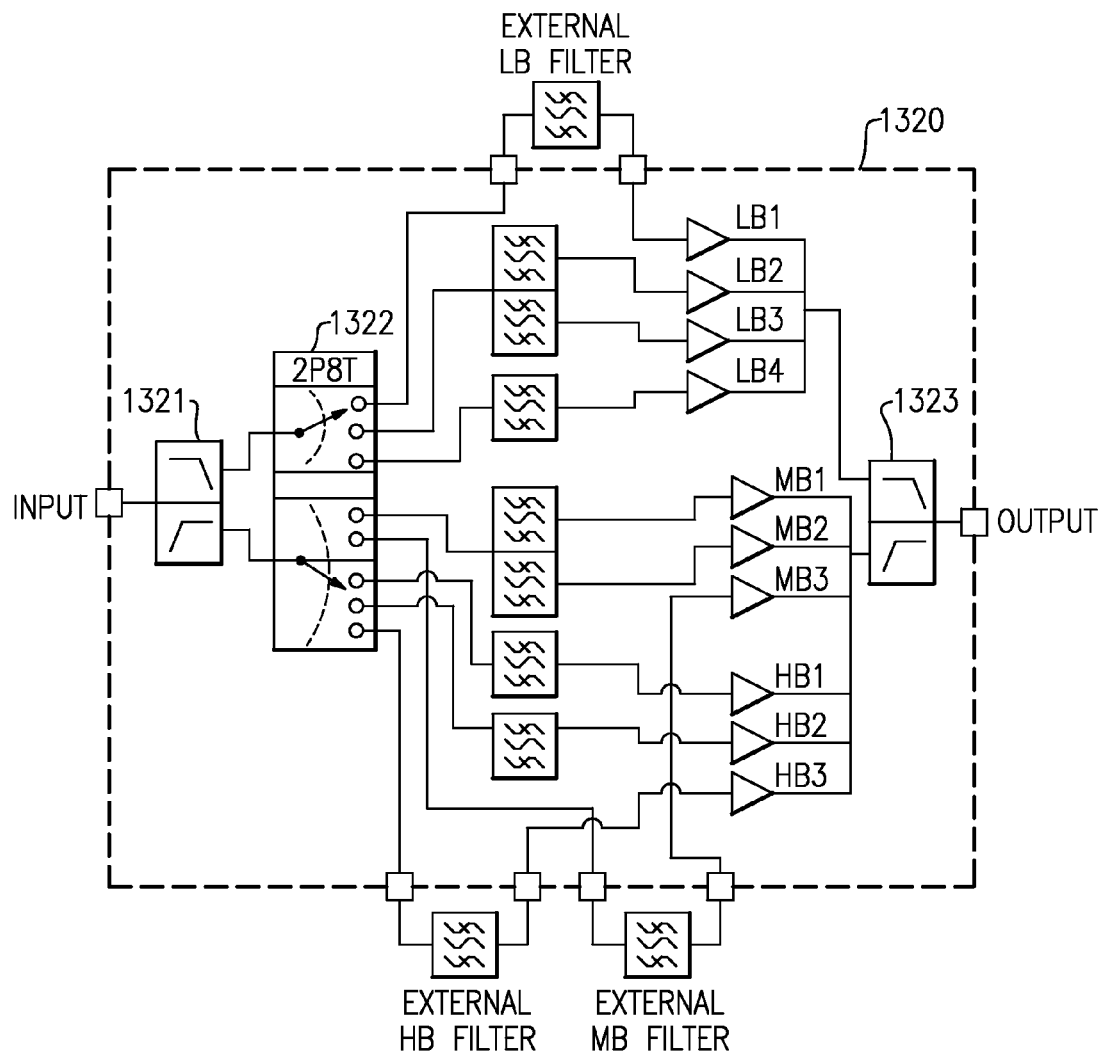

FIG. 13B shows that, in some embodiments, a DRx module 1320 can include a single input and a single output. The DRx module 1320 includes, as a band splitter, a high-low diplexer 1321 that splits an input signal into low frequency bands and mid and high frequency bands, a two-pole/eight-throw switch 1322 (implemented as a first single-pole/three-throw switch and a second single-pole/five-throw switch), and various filters and band-split diplexers. As described above, the high-low diplexer 1321 and the various filters and band-split diplexers can be co-designed. The DRx module 1320 includes, as an output multiplexer, a high-low combiner 1323 that filters and combines the signals received at two inputs and outputs the combined signal.

Figure 13C:
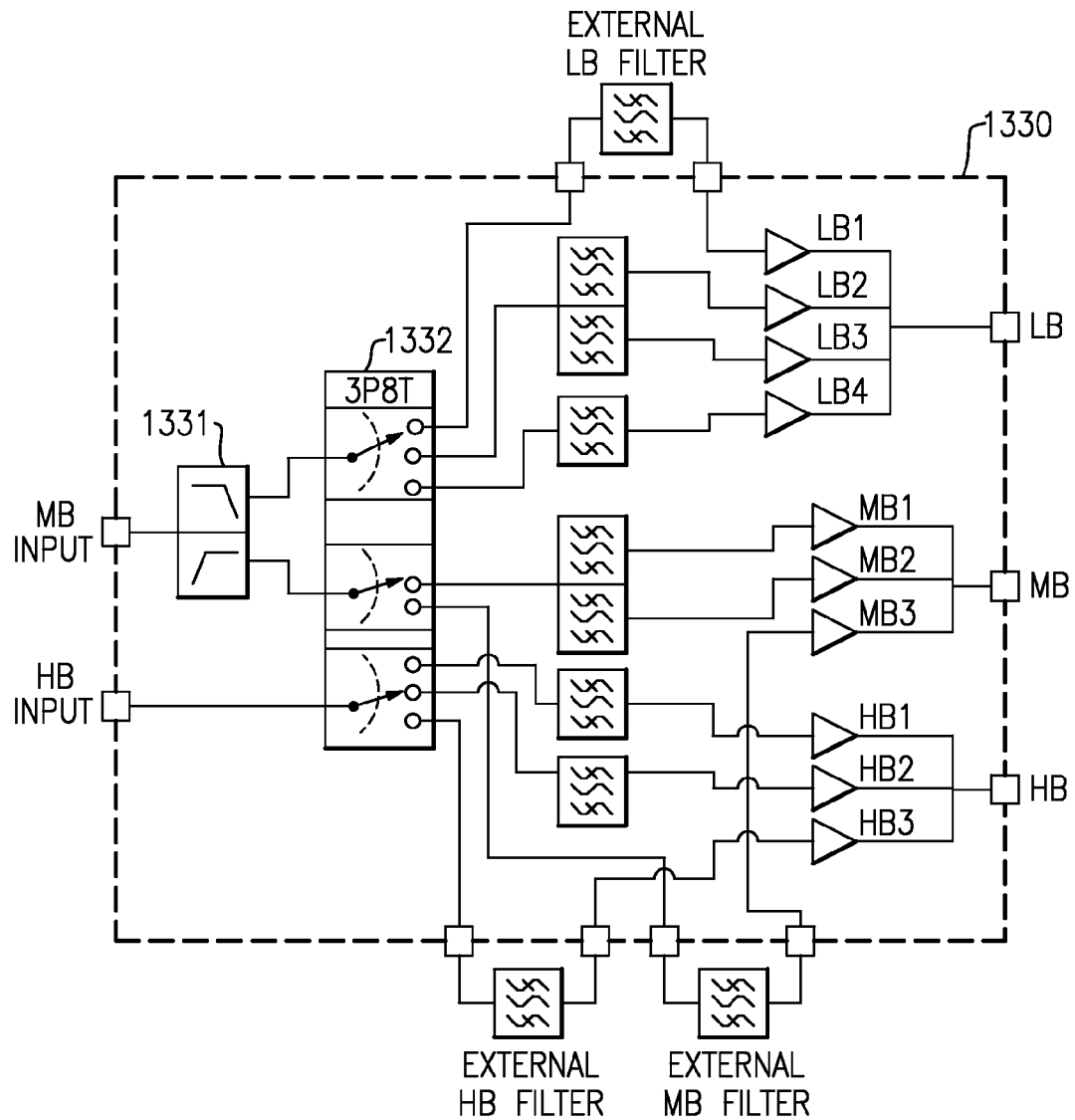

FIG. 13C shows that, in some embodiments, a DRx module 1330 can include two inputs and three outputs. The DRx module 1330 includes, as a band splitter, a high-low diplexer 1331 that splits an input signal into low frequency bands and mid and high frequency bands, a three-pole/eight-throw switch 1332 (implemented as a first single-pole/three-throw switch and a second single-pole/two-throw switch and a third single-pole/three-throw switch), and various filters and band-split diplexers. As described above, the high-low diplexer 1331 and the various filters and band-split diplexers can be co-designed.

Figure 13D:
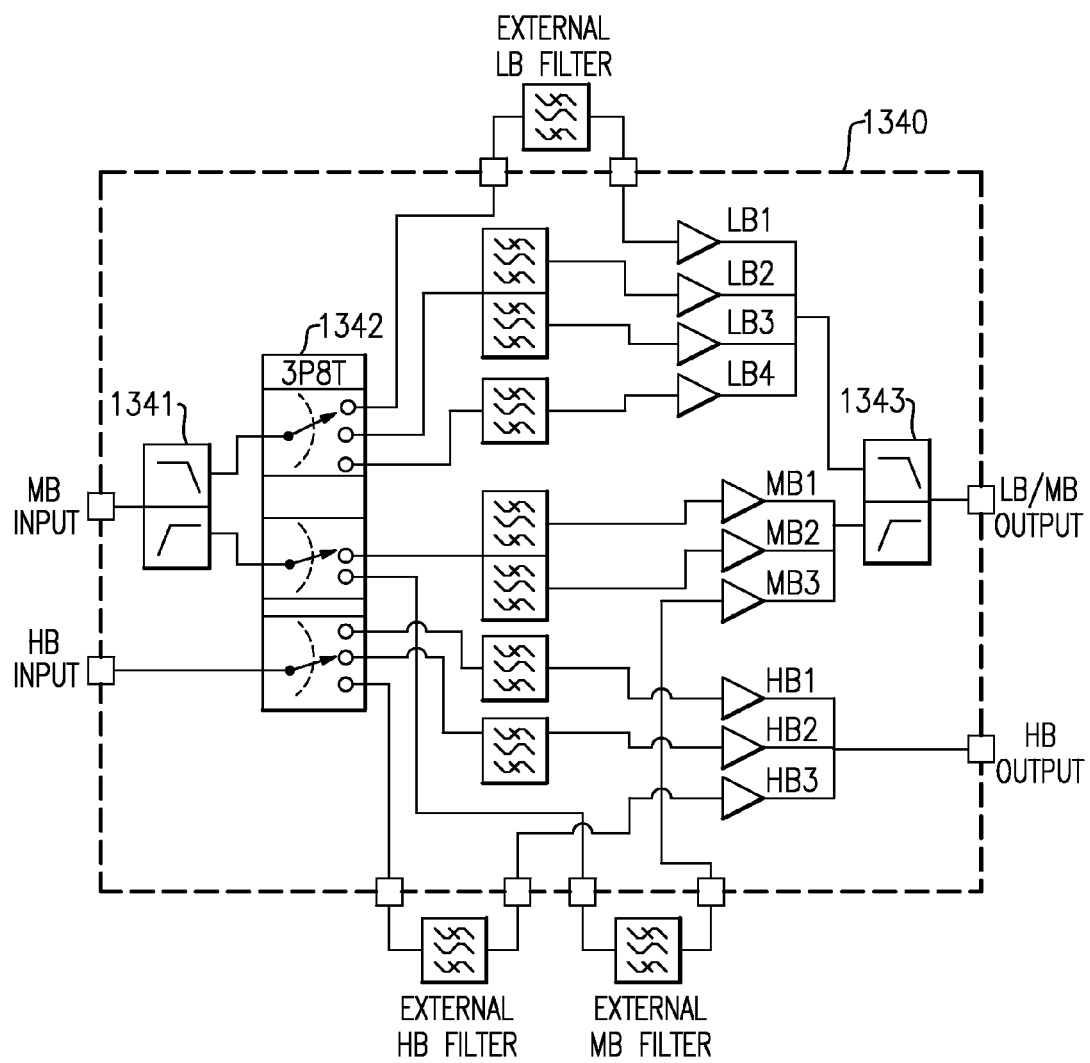

FIG. 13D shows that, in some embodiments, a DRx module 1340 can include two inputs and two outputs. The DRx module 1340 includes, as a band splitter, a high-low diplexer 1341 that splits an input signal into low frequency bands and mid and high frequency bands, a three-pole/eight-throw switch 1342 (implemented as a first single-pole/three-throw switch and a second single-pole/two-throw switch and a third single-pole/three-throw switch), and various filters and band-split diplexers. As described above, the high-low diplexer 1341 and the various filters and band-split diplexers can be co-designed. The DRx module 1340 includes, as part of an output multiplexer, a high-low combiner 1343 that filters and combines the signals received at two inputs and outputs the combined signal.

Figure 13E:
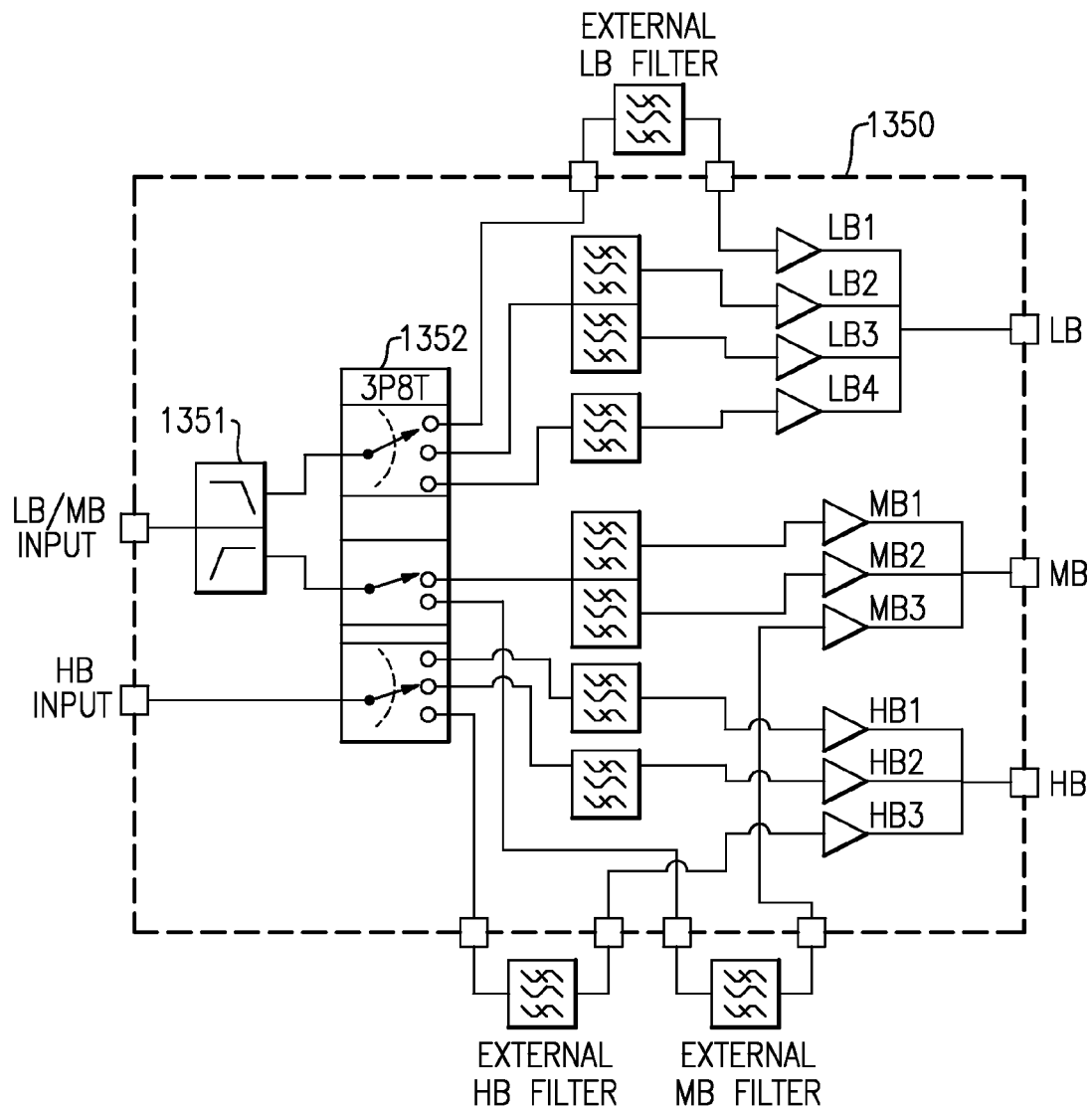

FIG. 13E shows that, in some embodiments, a DRx module 1350 can include a multi-pole/multi-throw switch 1352. The DRx module 1340 includes, as a band splitter, a high-low diplexer 1351 that splits an input signal into low frequency bands and mid and high frequency bands, a three-pole/eight-throw switch 1352, and various filters and band-split diplexers. As described above, the high-low diplexer 1341 and the various filters and band-split diplexers can be co-designed. The three-pole/eight-throw switch 1352 is implemented as a first single-pole/three-throw switch and a second two-pole/five-throw switch for routing a signal received on the first pole to one of the five throws and for routing a signal received on the second pole to one of three of the throws.

Figure 13F:
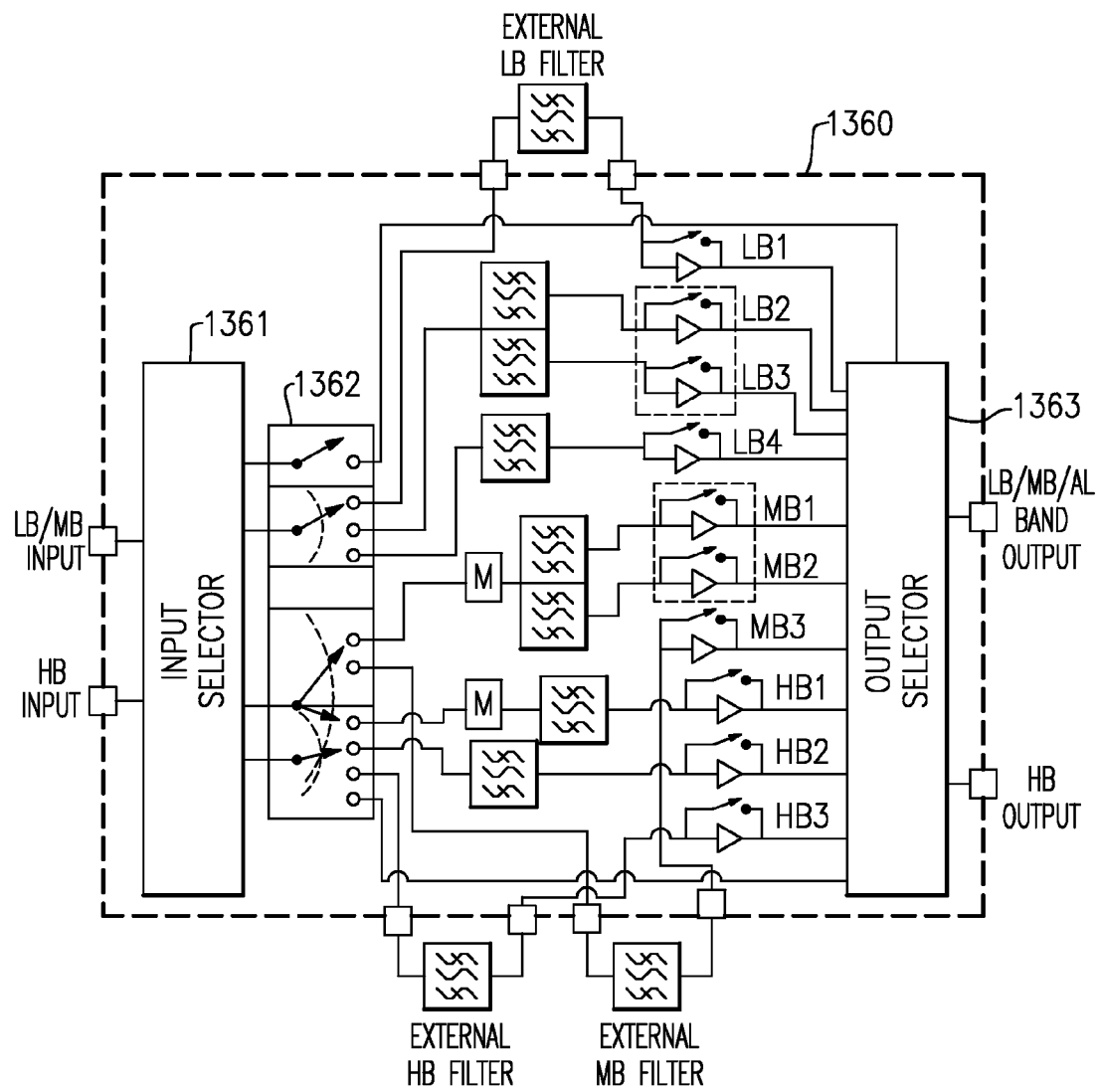

FIG. 13F shows that, in some embodiments, a DRx module 1360 can include an input selector 1361 and a multi-pole/multi-throw switch 1362. The DRx module 1360 includes, as a band splitter, an input selector 1361 (which operates as a two-pole/four-throw switch and may be implemented as shown in FIG. 11 and FIG. 12), a four-pole/ten-throw switch 1362, and various filters, matching components, and band-split diplexers. As described above, the input selector 1361, switch 1362 and the various filters, matching components, and band-split diplexers can be co-designed. The input selector 1361 and switch 1362, taken together, operate as a two-pole/ten-throw switch. The DRx module 1360 includes, as an output multiplexer, an output selector 1363 that can route the inputs to a selected one of the outputs (which may include combining signals). The output selector 1363 can be implemented using the aspects illustrated in FIG. 8 and FIG. 9.

Figure 14:
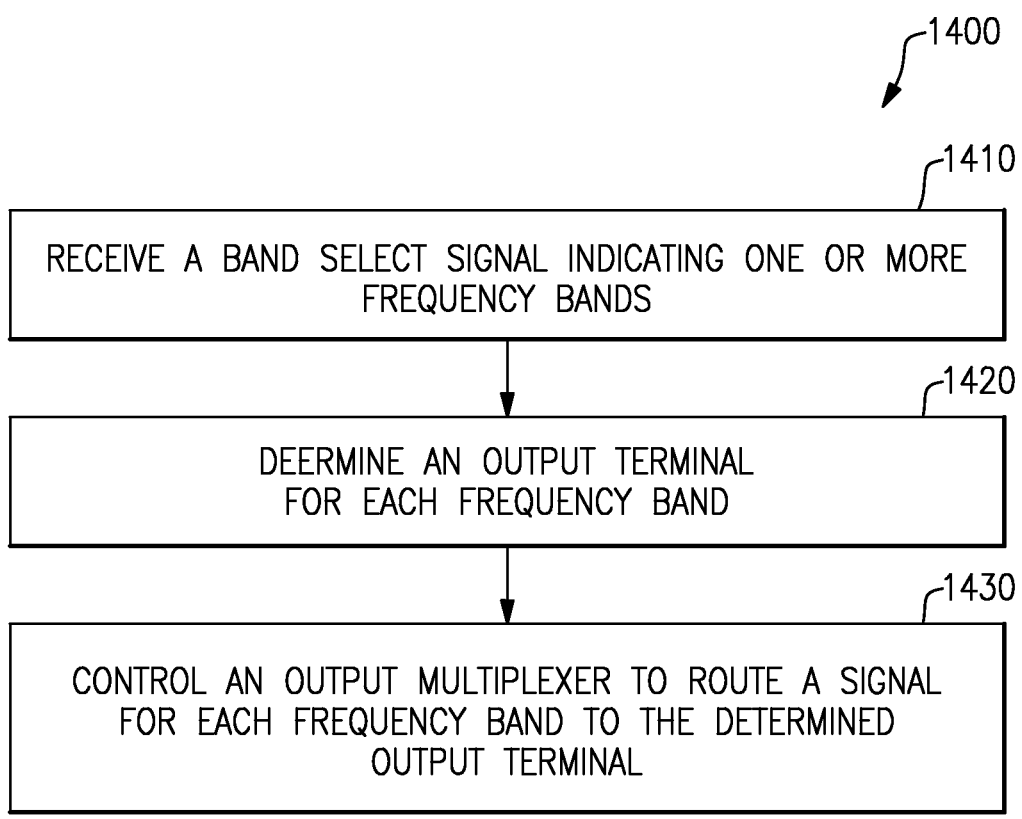
FIG. 14 shows an embodiment of a flowchart representation of a method of processing an RF signal.

FIG. 14 shows an embodiment of a flowchart representation of a method of processing an RF signal. In some implementations (and as detailed below as an example), the method 1400 is performed by a controller, such as the DRx controller 702 of FIG. 7 or the communications controller 120 of FIG. 3. In some implementations, the method 1400 is performed by processing logic, including hardware, firmware, software, or a combination thereof. In some implementations, the method 1400 is performed by a processor executing code stored in a non-transitory computer-readable medium (e.g., a memory). Briefly, the method 1400 includes receiving a band select signal and routing a received RF signal along one or more paths to selected outputs to process the received RF signal.

The method 1400 begins, at block 1410, with the controller receiving a band select signal. The controller may receive the band select signal from another controller or may receive the band select signal from a cellular base station or other external source. The band select signal may indicate one or more frequency bands over which a wireless device is to transmit and receive RF signals. In some implementations, the band select signal indicates a set of frequency bands for carrier aggregation communication.

At block 1420, the controller determines an output terminal for each frequency band indicated by the band select signal. In some implementations, the band select signal indicates a single frequency band and the controller determines a default output terminal for the single frequency band. In some implementations, the band select signal indicates two frequency bands and the controller determines a different output terminal for each of the two frequency bands. In some implementations, the band select signal indicates more frequency bands than there are usable output terminals and the controller determines to combine two or more of the frequency bands (and, thus, determines the same output terminal for two or more frequency bands). The controller can determine to combine the closest frequency bands or those furthest apart.

At block 1430, the controller controls an output multiplexer to route a signal for each frequency band to the determined output terminal. The controller can control the output multiplexer by opening or closing one or more SPST switches, determining a state of one or more SPMT switches, by sending an output multiplexer control signal, or by other mechanisms.

Figure 15:
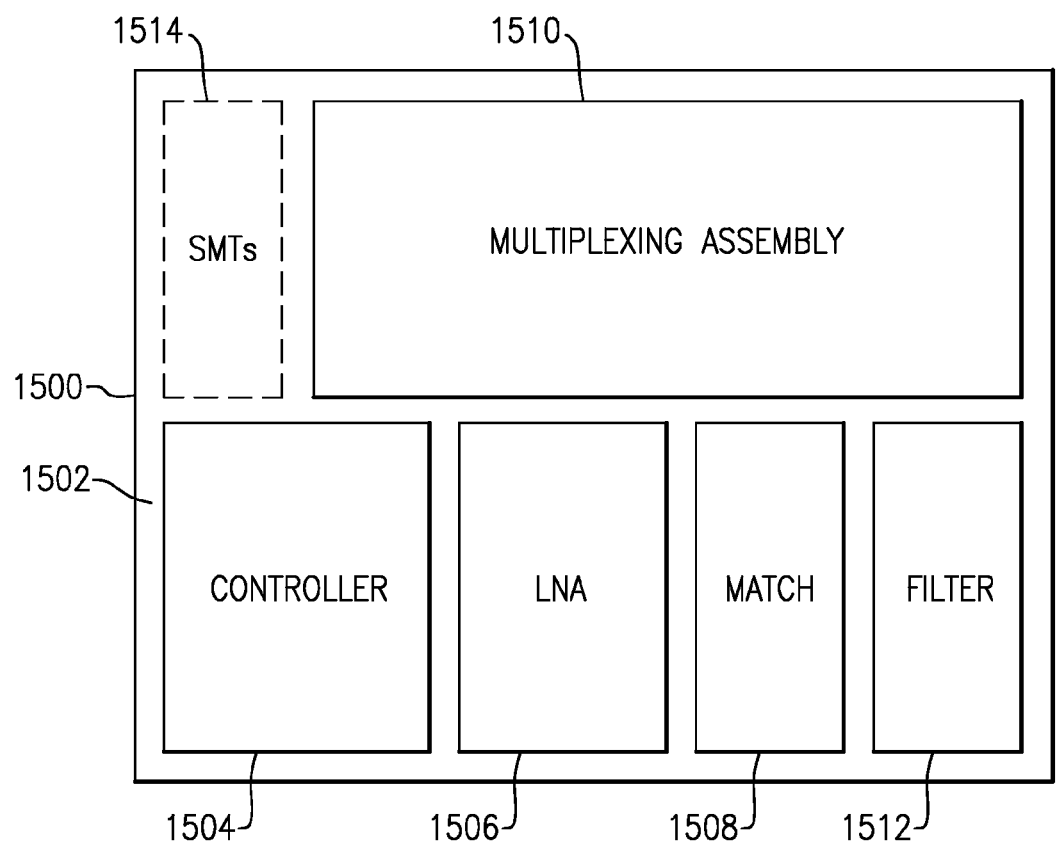
FIG. 15 depicts a module having one or more features as described herein.

FIG. 15 shows that in some embodiments, some or all of the diversity receiver configurations (e.g., those shown in FIGS. 3, 4, 5, 6, 7, 10, and 13A-13F) can be implemented, wholly or partially, in a module. Such a module can be, for example, a front-end module (FEM). Such a module can be, for example, a diversity receiver (DRx) FEM. In the example of FIG. 15, a module 1500 can include a packaging substrate 1502, and a number of components can be mounted on such a packaging substrate 1502. For example, a controller 1504 (which may include a front-end power management integrated circuit [FE-PIMC]), a low-noise amplifier assembly 1506 (which may include one or more variable-gain amplifiers), a match component 1508 (which may include one or more tunable matching circuits), a multiplexer assembly 1510 (which may include a dynamic routing input multiplexer and/or a dynamic routing output multiplexer), and a filter bank 1512 (which may include one or more bandpass filters) can be mounted and/or implemented on and/or within the packaging substrate 1502. Other components, such as a number of SMT devices 1514, can also be mounted on the packaging substrate 1502. Although all of the various components are depicted as being laid out on the packaging substrate 1502, it will be understood that some component(s) can be implemented over other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 16:
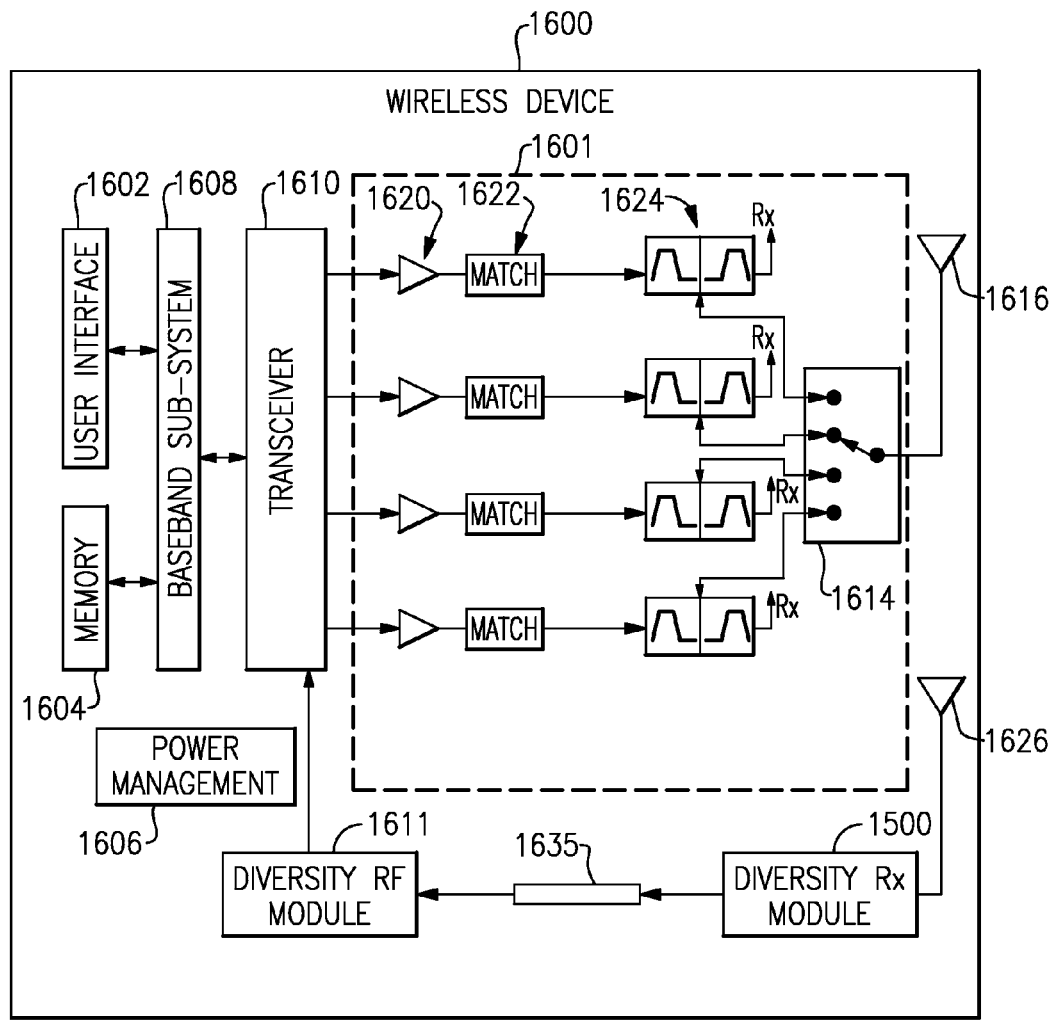
FIG. 16 depicts a wireless device having one or more features described herein.

FIG. 16 depicts an example wireless device 1600 having one or more advantageous features described herein. In the context of one or more modules having one or more features as described herein, such modules can be generally depicted by a dashed box 1601 (which can be implemented as, for example, a front-end module), a diversity RF module 1611 (which can be implemented as, for example, a downstream module), and a diversity receiver (DRx) module 900 (which can be implemented as, for example, a front-end module)

Referring to FIG. 16, power amplifiers (PAs) 1620 can receive their respective RF signals from a transceiver 1610 that can be configured and operated in known manners to generate RF signals to be amplified and transmitted, and to process received signals. The transceiver 1610 is shown to interact with a baseband sub-system 1608 that is configured to provide conversion between data and/or voice signals suitable for a user and RF signals suitable for the transceiver 1610. The transceiver 1610 can also be in communication with a power management component 1606 that is configured to manage power for the operation of the wireless device 1600. Such power management can also control operations of the baseband sub-system 1608 and the modules 1601, 1611, and 900.

The baseband sub-system 1608 is shown to be connected to a user interface 1602 to facilitate various input and output of voice and/or data provided to and received from the user. The baseband sub-system 1608 can also be connected to a memory 1604 that is configured to store data and/or instructions to facilitate the operation of the wireless device, and/or to provide storage of information for the user.

In the example wireless device 1600, outputs of the PAs 1620 are shown to be matched (via respective match circuits 1622) and routed to their respective duplexers 1624. Such amplified and filtered signals can be routed to a primary antenna 1616 through an antenna switch 1614 for transmission. In some embodiments, the duplexers 1624 can allow transmit and receive operations to be performed simultaneously using a common antenna (e.g., primary antenna 1616). In FIG. 16, received signals are shown to be routed to "Rx" paths that can include, for example, a low-noise amplifier (LNA).

The wireless device also includes a diversity antenna 1626 and a diversity receiver module 900 that receives signals from the diversity antenna 1626. The diversity receiver module 900 processes the received signals and transmits the processed signals via a cable 1635 to a diversity RF module 1611 that further processes the signal before feeding the signal to the transceiver 1610.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A receiving system comprising:
a plurality of amplifiers, each one of the plurality of amplifiers disposed along a corresponding one of a plurality of paths between an input of the receiving system and an output of the receiving system, each one of the plurality of paths corresponding to a different frequency band;
an input multiplexer having a first input multiplexer input coupled to a first antenna port and a second input multiplexer input coupled to a second antenna port, the input multiplexer configured to receive one or more RF signals at the first input multiplexer input and one or more RF signals at the second input multiplexer input, each one of the one or more RF signals received at the first input multiplexer input and each one of the one or more RF signals the second input multiplexer input including one or more frequency bands, the input multiplexer configured to output each of the one or more RF signals to one or more of a plurality of input multiplexer outputs; and
a controller configured to receive an antenna configuration signal and, based on the antenna configuration signal, to control the input multiplexer to route received RF signals to a first path of the plurality of paths in response to a first antenna configuration signal and to route received RF signals to a second path of the plurality of paths in response to a second antenna configuration signal, individual paths corresponding to the one or more frequency bands of the RF signal.

2. The receiving system of claim 1 wherein, in response to an antenna configuration signal indicating that the receiving system includes a single antenna coupled to the first antenna port, the controller is configured to control the input multiplexer to route an RF signal received at the first input multiplexer input to all of the plurality of input multiplexer outputs associated with the one or more frequency bands of the RF signal.

3. The receiving system of claim 1 wherein, in response to an antenna configuration signal indicating that the receiving system includes a single antenna coupled to the first antenna port, the controller is configured to control the input multiplexer to route an RF signal received at the first input multiplexer input to all of the plurality of input multiplexer outputs.

4. The receiving system of claim 1 wherein, the controller is configured to, in response to the first antenna configuration signal, to control the input multiplexer to route an RF signal received at the first input multiplexer input to an input multiplexer output and, in response to the second antenna configuration signal, to control the input multiplexer to route an RF signal received at the second input multiplexer input to the input multiplexer output.

5. The receiving system of claim 1 wherein the first input multiplexer input is coupled to the plurality of input multiplexer outputs via a first plurality of switches and the second input multiplexer input is coupled to the plurality of input multiplexer outputs via a second plurality of switches.

6. The receiving system of claim 5 wherein the controller controls the input multiplexer by controlling the first plurality of switches and the second plurality of switches.

7. The receiving system of claim 6 wherein the first plurality of switches includes a first plurality of single-pole/single-throw (SPST) switches and the second plurality of switches includes a second plurality of SPST switches.

8. The receiving system of claim 1 wherein the first input multiplexer input is coupled to a first input multiplexer output, a second input multiplexer output via a first switch, and a third input multiplexer output via a second switch and the second input multiplexer input is coupled to the second input multiplexer output via the first switch, the third input multiplexer output via the second switch, and a fourth input multiplexer output.

9. The receiving system of claim 8 wherein the controller controls the input multiplexer by controlling the first switch and the second switch.

10. The receiving system of claim 8 wherein the first switch includes a first multiple-pole/single-throw (MPST) switch and the second switch includes a second MPST.

11. The receiving system of claim 1 wherein the controller is further configured to receive a band select signal and to control the input multiplexer based on the band select signal.

12. The receiving system of claim 1 wherein the input multiplexer is implemented as a band splitter.

13. The receiving system of claim 12 wherein the band splitter includes one or more bandpass filters.

14. The receiving system of claim 12 wherein the band splitter includes one or more diplexers.

15. The receiving system of claim 1 further comprising a first antenna coupled to the first input multiplexer input through the first antenna port and a second antenna coupled to the second input multiplexer input through the second antenna port.

16. A radio-frequency (RF) module comprising:
a packaging substrate configured to receive a plurality of components; and
a receiving system implemented on the packaging substrate, the receiving system including a plurality of amplifiers, each one of the plurality of amplifiers disposed along a corresponding one of a plurality of paths between an input of the receiving system and an output of the receiving system, each one of the plurality of paths corresponding to a different frequency band, an input multiplexer having a first input multiplexer input coupled to a first antenna port and a second input multiplexer input coupled to a second antenna port, the input multiplexer configured to receive one or more RF signals at the first input multiplexer input and one or more RF signals at the second input multiplexer input, each one of the one or more RF signals received at the first input multiplexer input and each one of the one or more RF signals the second input multiplexer input including one or more frequency bands, the input multiplexer configured to output each of the one or more RF signals to one or more of a plurality of input multiplexer outputs, and a controller configured to receive an antenna configuration signal and, based on the antenna configuration signal, to control the input multiplexer to route received RF signals to a first path of the plurality of paths in response to a first antenna configuration signal and to route received RF signals to a second path of the plurality of paths in response to a second antenna configuration signal, individual paths corresponding to the one or more frequency bands of the RF signal.

17. The RF module of claim 16 wherein the RF module is a diversity receiver front-end module (FEM).

18. The RF module of claim 16 wherein the input multiplexer is implemented as a band splitter including at least one of a bandpass filter or a diplexer.

19. A wireless device comprising:
a first antenna configured to receive a first radio-frequency (RF) signal;
a first front-end module (FEM) in communication with the first antenna, the first FEM including a packaging substrate configured to receive a plurality of components, the first FEM further including a receiving system implemented on the packaging substrate, the receiving system including a plurality of amplifiers, each one of the plurality of amplifiers disposed along a corresponding one of a plurality of paths between an input of the receiving system and an output of the receiving system, each one of the plurality of paths corresponding to a different frequency band, an input multiplexer having a first input multiplexer input coupled to a first antenna port and a second input multiplexer input coupled to a second antenna port, the input multiplexer configured to receive one or more RF signals at the first input multiplexer input and one or more RF signals at the second input multiplexer input, each one of the one or more RF signals received at the first input multiplexer input and each one of the one or more RF signals the second input multiplexer input including one or more frequency bands, the input multiplexer configured to output each of the one or more RF signals to one or more of a plurality of input multiplexer outputs, and a controller configured to receive an antenna configuration signal and, based on the antenna configuration signal, to control the input multiplexer to route received RF signals to a first path of the plurality of paths in response to a first antenna configuration signal and to route received RF signals to a second path of the plurality of paths in response to a second antenna configuration signal, individual paths corresponding to the one or more frequency bands of the RF signal; and a communications module configured to receive a processed version of the first RF signal from the first FEM via a plurality of transmission lines respectively coupled to the plurality of output multiplexer outputs and to generate data bits based on the processed version of the first RF signal.

20. The wireless device of claim 19 further comprising a second antenna configured to receive a second radio-frequency (RF) signal and a second FEM in communication with the second antenna, the communications module being configured to receive a processed version of the second RF signal from an output of the second FEM and generate the data bits based on the processed version of the second RF signal.

* * * * *